(12) United States Patent
Spadacini et al.

(10) Patent No.: US 12,140,052 B2
(45) Date of Patent: Nov. 12, 2024

(54) PLANT AND PROCESS FOR ENERGY STORAGE

(71) Applicant: ENERGY DOME S.p.A., Milan (IT)

(72) Inventors: Claudio Spadacini, Milan (IT); Dario Rizzi, Milan (IT)

(73) Assignee: ENERGY DOME S.p.A., Milan (IT)

( * ) Notice: Subject to any disclaimer, the term of this patent is extended or adjusted under 35 U.S.C. 154(b) by 0 days.

(21) Appl. No.: 18/246,458

(22) PCT Filed: Sep. 25, 2020

(86) PCT No.: PCT/IT2020/000068
§ 371 (c)(1),
(2) Date: Mar. 23, 2023

(87) PCT Pub. No.: WO2022/064533
PCT Pub. Date: Mar. 31, 2022

(65) Prior Publication Data
US 2023/0358150 A1  Nov. 9, 2023

(51) Int. Cl.
*F01K 25/10* (2006.01)
*F01K 3/12* (2006.01)

(52) U.S. Cl.
CPC .............. *F01K 25/103* (2013.01); *F01K 3/12* (2013.01)

(58) Field of Classification Search
CPC ... F01K 3/12; F01K 3/18; F01K 25/10; F01K 25/103; F25J 1/00; F25J 2240/10;
(Continued)

(56) References Cited

U.S. PATENT DOCUMENTS

| 4,147,205 A | 4/1979 | Bata et al. |
| 5,934,063 A * | 8/1999 | Nakhamkin ............ F02C 6/16 60/773 |

(Continued)

FOREIGN PATENT DOCUMENTS

| EP | 2 532 843 A1 | 12/2012 |
| EP | 2 220 343 B1 | 6/2013 |

(Continued)

OTHER PUBLICATIONS

International Search Report issued Jun. 7, 2021 in PCT/IT2020/000068, 4 pages.

(Continued)

*Primary Examiner* — Loren C Edwards
(74) *Attorney, Agent, or Firm* — Oblon, McClelland, Maier & Neustadt, L.L.P.

(57) ABSTRACT

A plant for energy storage, comprises: a basin (2) for a work fluid having a critical temperature ($T_c$) lower than 0°; a tank (3) configured to store the work fluid in at least partly liquid or super-critical phase with a storage temperature ($T_s$) close to the critical temperature ($T_c$); an expander (4); a compressor (5); an operating/drive machine (6) operatively connected to the expander (4) and to the compressor (5); a thermal store (8) operatively interposed between the compressor (5) and the tank (3) and between the tank (3) and the expander (4). The plant (1) is configured for actuating a Cyclic Thermodynamic Transformation (TTC) with the work fluid, first in a storage configuration and then in a discharge configuration. The thermal store (8), in the storage configuration, is configured for absorbing sensible heat and subsequently latent heat from the work fluid and, in the discharge configuration, it is configured for transferring latent heat and subsequently sensible heat to the work fluid.

14 Claims, 16 Drawing Sheets

(58) Field of Classification Search
CPC ......... F25J 2240/70; Y02E 60/14; F02C 6/14; F02C 6/16
See application file for complete search history.

(56) References Cited

U.S. PATENT DOCUMENTS

| | | | |
|---|---|---|---|
| 6,920,759 | B2 | 7/2005 | Wakana et al. |
| 7,663,255 | B2 | 2/2010 | Kim et al. |
| 7,821,158 | B2 | 10/2010 | Vandor |
| 8,966,902 | B2 | 3/2015 | Stiesdal |
| 8,991,183 | B2 | 3/2015 | Stiesdal |
| 9,217,423 | B2 | 12/2015 | Chen et al. |
| 9,890,712 | B2 | 2/2018 | Morgan et al. |
| 10,550,732 | B2 | 2/2020 | Bailey et al. |
| 2007/0186563 | A1 | 8/2007 | Vandor et al. |
| 2009/0282840 | A1 | 11/2009 | Chen et al. |
| 2010/0257862 | A1 | 10/2010 | Howes et al. |
| 2011/0100010 | A1 | 5/2011 | Freund et al. |
| 2011/0204064 | A1 | 8/2011 | Crane et al. |
| 2014/0223910 | A1 | 8/2014 | Brunhuber et al. |
| 2015/0184590 | A1 | 7/2015 | Conlon |
| 2015/0192330 | A1 | 7/2015 | Alekseev |
| 2015/0300209 | A1 | 10/2015 | Goldman |
| 2016/0215695 | A1* | 7/2016 | Bootello ............... F22B 1/006 |
| 2016/0298455 | A1 | 10/2016 | Laughlin |
| 2017/0058768 | A1 | 3/2017 | Bergins et al. |
| 2017/0175585 | A1* | 6/2017 | Alekseev ............. F25J 1/0228 |
| 2018/0187971 | A1 | 7/2018 | Sinatov |
| 2020/0182542 | A1 | 6/2020 | Lin et al. |

FOREIGN PATENT DOCUMENTS

| | | |
|---|---|---|
| EP | 2 698 506 A1 | 2/2014 |
| EP | 2 500 565 B1 | 3/2016 |
| GB | 2518125 A | 3/2015 |
| JP | 10-238366 A2 | 9/1998 |
| JP | 2013-510257 | 3/2013 |
| WO | WO 2015/138817 A1 | 9/2015 |
| WO | WO 2020/039416 A2 | 2/2020 |

OTHER PUBLICATIONS

Written Opinion of the International Searching Authority issued Jun. 7, 2021 in PCT/IT2020/000068, 7 pages.

Kim, "Novel Concepts of Compressed Air Energy Storage and Thermo-Electric Energy Storage", Ecole Polytechnique Federale de Lousanne, 2012, 204 pages.

Guo et al., "Thermodynamic Characteristics of a Novel Supercritical Compressed Air Energy Storage System", Energy Conversion and Management, 2016, vol. 115, pp. 167-177.

Wang et al., "The Application of Cryogens in Liquid Fluid Energy Storage Systems", Physics Procedia, 2015, vol. 67, pp. 728-732.

Guizzi et al., "Thermodynamic Analysis of a Liquid Air Energy Storage System", Energy 93, 2015, pp. 1-35.

Kim et al., "Pressurized Cryogenic Air Energy Storage for Efficiency Improvement of Liquid Air Energy Storage" Energy Procedia, 2019, vol. 158, pp. 5086-5091.

Japanese Office Action issued in Japanese Patent Application No. 2023-518174 on Mar. 26, 2024, (w/ English translation).

* cited by examiner

PLANT AND PROCESS FOR ENERGY STORAGE

FIELD OF THE FINDING

The object of the present invention is a plant and a process for energy storage. More precisely, the object of the present invention is a system capable of absorbing/using electrical energy from a network or a system in the periods in which there is excess availability or scarce consumption, capable of maintaining the stored energy over time and capable of transforming it into electrical energy and reintroducing it into the network at the times of request of said electrical energy. More in detail, the present invention relates to a system for storing electrical energy in the form of potential energy (pressure) and thermal/thermodynamic energy. The present invention is situated in the field of medium-size and large-scale energy storage systems, for both land and sea applications, typically with powers ranging from hundreds of kW up to tens of MW (e.g. 20-25 MW), but also hundreds of MW, and with storage capacity ranging from a few hundred kWh to hundreds of MWh and even up to several GWh. The present invention can also be situated in the field of small-scale energy storage systems, for home and commercial applications, stationary as well as for land transportation (trains, commercial vehicles, automobiles) and sea transportation, typically with powers ranging from several kW to several hundred kW and with storage capacity ranging from a few kWh up to hundreds of kWh and up to several MWh or tens of MWh.

The present invention is also situated in the field of plants for storage and production of mechanical/electrical energy, and the object of the present invention is a system capable of absorbing/using electrical energy, from a network or a system in the periods in which there is excess availability or scarce consumption, capable of maintaining the stored energy over time and capable of transforming it into electrical energy, also in a quantity higher than that stored by means of the use of recovery heat, and/or combustion of additional fuel, in various configurations described in the patent itself.

Definitions

In the present description and in the enclosed claims, reference will be made to the following definitions.

Thermodynamic cycle (CT): thermodynamic transformation from a point X to a point Y, where X coincides with Y; the CT unlike the TTC (Cyclic Thermodynamic Transformation) described below does not have mass stores (significant for energy purposes) within the cycle, while the TTC typically works between two stores, one initial and the other final of the work fluid;

Cyclic Thermodynamic Transformation (TTC): thermodynamic transformation from a point X to a point Y and from a point Y to a point X, without necessarily passing from the same intermediate points;

Closed CT and/or TTC: without mass exchange (significant for energy purposes) with the atmosphere;

Open CT and/or TTC: with mass exchange (significant for energy purposes) with the atmosphere;

Cyclic Thermodynamic Transformation (TTC): thermodynamic transformation from a point X to a point Y and from a point Y to a point X, without necessarily passing from the same intermediate points;

Critical point: particular pair of temperature and pressure values above which a substance can no longer exist as a two-phase vapor-liquid mixture but rather exists as a supercritical fluid; the corresponding pressure to the critical phase is termed supercritical pressure, while the temperature corresponding to the critical phase is termed critical temperature;

Basin: space occupied or configured for being occupied by a fluid.

Background of the Finding

Recently, due to the ever-increasing diffusion of systems for producing energy from renewable sources, and in particular from wind and photovoltaic sources, which are characterized by production variability and unpredictability, electrical energy storage systems are taking on ever-increasing importance.

Alongside the systems which function according to electrochemical principles (batteries) which typically have high costs and limited useful lifetime, mechanical principles (flywheels) suitable only for small quantities of stored energy, the systems used today, or being developed or in any case known include the following.

The systems mainly in use are the storage systems for hydroelectric pumping (PUMPED HYDRO STORAGE—PHS), which currently cover more than 90% of the storage capacity installed worldwide. Said systems are suitable both for long-term and short-term storage, they are rather competitive regarding costs, but they have the disadvantage that they can only be attained in places that have particular geomorphological conditions. Said PHS system is among the systems for storing energy in potential form and in particular gravitational form. Still in the family of gravitational systems, there is the system pursuant to the document GB 2518125 A.

A second system in use is that pursuant to the finding described in the document WO2020/039416 in the name of the same Applicant, which is constituted by a Closed TTC which stores by means of transformation into potential energy (pressure) and (possibly) thermal energy, by means of a fluid with critical temperature close to the atmospheric temperature, such as $CO_2$, compressing the same fluid by a pressure close to the atmospheric pressure up to a pressure close to the critical pressure.

Another system in use is the so-called system CAES (Compressed Air Energy Storage) which is constituted by an Open TTC which stores by means of transformation into potential energy (pressure) and (possibly) thermal energy. Such CAES system is known both in the base configuration (non-adiabatic) and in the most-advanced AA-CAES (Advanced Adiabatic CAES; see U.S. Pat. No. 4,147,205—Compressed Air Storage Installation) configuration. The known CAES systems normally operate by compressing the air in supercritical conditions, i.e. above the critical pressure of about 38 bar, at temperatures close to ambient temperature, hence much higher than the critical temperature of the air equal to about −140° C. Said systems are suitable both for long-term and short-term storage, they are rather competitive regarding costs, but they are less efficient with respect to the PHS systems in terms of 'Round Trip Efficiency' and they also have the disadvantage that they can be made, in an economically competitive manner, only in places that have particular geomorphological conditions.

The CAES systems also have a further disadvantage in that the pressure of the tank/cave varies with the variation of the charge level of the same. This affects both the efficiency of the TTC, and the efficiency of the turbomachines that execute the same.

Systems are also known for remedying the presence of subterranean caves for the CAES systems. In particular, solutions are known that seek to make the storage of energy in over-ground tanks more economically advantageous, without requiring the presence of subterranean caves. One example is found in US 2011/0204064 A1 by LIGHTSAIL where tanks are proposed with special structure in order to seek to contain the costs of the over-ground storage tanks, which would otherwise overly raise the costs of said CAES over-ground systems. Also these solutions belong to the systems which work according to an Open TTC.

Systems are also known which combine the two preceding systems (see U.S. Pat. No. 7,663,255 B2), in which the combination between CAES and PHS also allows operating the CAES system at a constant compression pressure. Also these systems work according to an Open TTC.

The document 'Novel concept of compressed air energy storage and thermos-electric energy storage'—THESE N.5525 (2012)—Ecole Polytechnique Federale de Lousanne, illustrates all the types of CAES energy storage systems. Among others, the following CAES systems are presented: diabatic, adiabatic, isothermal and combined with PHS in order to allow a constant compression pressure. Said system is termed Constant Pressure-CAES combined with PHS. Also these are systems which work according to an Open TTC.

The same abovementioned document also illustrates the so-called TEES (Thermo Electric Energy Storage) proposed by ABB Corporate Research Center (see also EP 2532843 A1 and EP 2698506 A1). This belongs to the systems which work according to a Closed CT, and belongs to the PHES systems. The PHES (pumped heat electrical storage) systems are systems for storing electrical/mechanical energy by means of transformation into thermal energy by means of CT Rankine, Brayton or Kalina, for example.

In addition to the abovementioned systems which provide for the use of trans-critical and supercritical cycles with $CO_2$ or other fluids and hence of reversible trans-super-critical Rankine cycles, PHES systems with Brayton cycle are known, typically using air or argon (see Isoentropic EP 2220343 B1 and US 2010/0257862 A1 and Laughlin US 2016/0298455 A1). This belongs to the systems which work according to a Closed CT, and can be included among the PHES systems.

Another system included along the PHES/TEES systems is the Siemens-Gamesa system (see US 2014/0223910 A1 and U.S. Pat. No. 8,991,183 B2 and U.S. Pat. No. 8,966,902 B2) which combines two different cycles for the charging and discharging phase, and in particular it provides for a Brayton cycle or simple dissipation with electrical heating elements for the step of charging the heat storage tank at high temperature and a steam Rankine cycle for the step of discharging/producing electrical energy. This solution type is included among the PHES systems. It is attained by means of multiple Open CT and/or Closed CT.

It should be observed that all the PHES systems, also termed TEES, are based on a principle of 'closed' and reversible thermodynamic cycle. Depending on the different proposed solutions, there can be 'closed' Rankine or Brayton cycles, but in any case the work fluid of the nearly-reversible heat motor/pump executes transformations according to a 'closed' thermodynamic cycle in which there are no intermediate stores sized in relation to the required storage capacity.

All the CAES systems, of all types, are instead systems which carry out, first in one sense and then in the other according to an Open TTC, i.e. by taking and returning air to the atmosphere.

Another known energy storage method is the so-called LAES (Liquid Air Energy Storage, see US2009/0282840 A1) system. The method LAES provides for transformations according to an 'open' thermodynamic cycle, i.e. by taking and returning air to the atmosphere. In addition, such system works at cryogenic temperatures, close to −200° C. with high technical difficulties. This also belongs to the systems which work according to an Open TTC, nevertheless during the charging step. The transformation is not only moved from a point X to a point Y, but carries out a thermodynamic cycle, also known as Claude or Linde-Hampson Cycle. More specifically, the LAES system pursuant to the abovementioned US2009/0282840 works according to a cycle termed 'Claude and/or Linde-Hampson', producing liquid air at about −195° C. at low pressure, close to atmospheric pressure, by means of a process of compression, cooling, recirculation and throttle/expansion of the compressed air pre-cooled by means of the throttle valve or expander to form a vapor-liquid (or moist vapor) mixture with high liquid content, where said liquid will then be stored in suitable tanks for liquid air at low pressure, while the vapor comes to feed the air cooling exchanger. Said liquefaction process can also make use of a cold energy storage which is charged during the discharge step.

In the subsequent discharge step, the liquid air that is situated at low pressure is pumped by means of the pump and subsequently heated by transferring heat to the cold energy storage. Said cold energy storage system is more easily identifiable in the U.S. Pat. Nos. 9,890,712B2 and 10,550,732B2.

The systems pursuant to the documents U.S. Pat. Nos. 9,890,712B2 and 10,550,732B2 also represent LAES systems, with production of liquid air at about −195° C. and nearly atmospheric pressure, by means of system analogous to the preceding according to a Claude or Linde-Hampson cycle or the like, with a series of compressors and companders (compressors/cryogenic expanders). Both of the abovementioned systems provide for a discharge step through compression of the liquid air by means of a pump and the recovery of the cold energy, in one case with an indirect exchange and storage system and in the second with a storage system, downstream of the expander.

The document Thermodynamic analysis of a Liquid Air Energy Storage System by Guizzi, Manno, Tolomei, Vitali describes the optimization parameters of the processes of LAES type like those described above, showing that said cycles—in order to be able to approach RTE on the order of 50-55%—must reach pressures on the order of 150-200 bar.

A variant of the LAES system is described in U.S. Pat. No. 9,217,423B2/EP2500565B1 and US202000182542A1. Here the authors name their system SC-CAES, i.e. Super-Critical CAES, nevertheless as also represented in the article by the same authors "Thermodynamic characteristics of a novel supercritical compressed air energy storage system" by Gou, Xu, Chen, Zhou. Said system—unlike the abovementioned and described LAES systems—operates the same liquefaction of the air up to about −195° C. and nearly atmospheric pressure, but with a multi-stage compression, intercooled with storage of the intercooling heat.

However, the liquefaction process—by means of the valve/expander with recirculation of the consequent vapor and with the nearly-atmospheric storage at a pressure much lower than that of the compressor (at about 1 bar or several bars against the about 100 bar and beyond of the compressor delivery)—remains unchanged and in addition the pump remains necessary for increasing the pressure of the liquid air before the heating and then expansion, so as to increase the RTE of the system to levels close to 50-55% and hence acceptable.

A further characteristic shared by all the abovementioned LAES systems, including the latter, termed SC_CAES, but in reality a LAES system, is the fact that the maximum delivery pressure of the compressor, before the throttle valve/cryogenic expander, the maximum pump delivery pressure, which suctions low-pressure liquid air from the tank, are typically super-critical, i.e. at pressure higher than about 37 bar.

Also the system of the document US202000182542A1 analogously shows the valve/expander and the pump.

A further variant, termed PCAES, is represented in 'Pressurised cryogenic air energy storage for efficiency improvement of liquid air energy storage" by Kim and Chang.

In said system, unlike the preceding, instead of liquid air being produced at about −195° C. and about atmospheric pressure, a supercritical and cryogenic air is produced at about 40 bar and about −140° C. Always present in such system is the pressure reduction system (expander before the storage) which reduces the pressure from that of delivery of the compressor (except for the load losses, indicated at about 120 bar) to the storage pressure slightly higher than the critical pressure (i.e. about 40 bar, slightly higher than 37.8 bar). Also present is the same pump downstream of the storage system which pressurizes the fluid before evaporation and expansion of the discharge step, so as to obtain an improved RTE. Said pressurization is significant and is indicated in the document at 70 bar, starting from about 40 bar of storage.

Said system, like the preceding systems, provides for a step of compression at a pressure higher than that of storage, a reduction of the pressure in this case to about the critical pressure, in the other cases to about the atmospheric pressure, and the subsequent pressurization downstream of the storage by means of cryogenic pumps, and the heating with recovery and storage of the cold energy and the subsequent expansion;

In the latter case (PCAES), also the storage pressure is supercritical and for this reason there is no vapor recirculation in charging step.

In any case, none of the abovementioned systems provides for the storage of the latent heat of condensation of the air. In other words, during charging it is never provided to traverse the Andrews curve, i.e. the condensation via heat exchange of the air with a means for storing said heat.

Table 2 of 'Pressurised cryogenic air energy storage for efficiency improvement of liquid air energy storage" by Kim and Chang shows the characteristic parameters of the two proposed systems.

In addition, the document "The Application of Cryogens in liquid fluid energy storage system" by Wang, Xue, Zhang, Guo, Zhou, Wang describes the same LAES process described above with other fluids, such as nitrogen and $CO_2$. As shown by FIG. 2 of the same document, the proposed system with nitrogen or $CO_2$ always operates according to the Claude or Linde-Hampson cycle or the like in charging step and always has a pressurization by means of a pump in discharge step (see FIG. 2 of "The Application of Cryogens in liquid fluid energy storage system" by Wang, Xue, Zhang, Guo, Zhou, Wang).

The documents US20170058768A1 and U.S. Pat. No. 7,821,158B2 and U.S. Pat. No. 6,920,759B2 also show specific configurations of the same LAES system, in a case combined with a heat recovery from first machines that provide for internal combustion, and in other particular configurations.

Also the document WO2015138817A1 provides for a pressure reduction by means of an expander placed upstream of a cryogenic storage and subsequent pumping by means of a pump before the discharge expansion and downstream of the cryogenic storage.

Overall, all the above-illustrated systems constituting the prior art can be schematized as in the enclosed FIG. 1.

In such FIG. 1 (prior art), the elements are visible:
1. a charging system 100, at the very least comprising a compressor 101, but also possibly other compressors, exchangers, expanders, companders etc., with a single flow, but also with internal recirculation, in connection with a subsequent pressure reduction means 102 (throttle valve or cryogenic expander), and in thermal/fluidic connection with one or more systems 103 for storing cold energy, and possibly thermal energy;
2. a pressure reduction system 102 (throttle valve/expander);
3. a system 104 for storing the liquid or supercritical air, cryogenic air or air that is nearly-adiabatic, i.e. without direct or indirect storage of heat (by means of a solid and/or liquid medium and/or in phase change and/or chemical medium);
4. a pressurization system 105 (pump or compressor);
5. a discharge system 106 comprising exchangers, expanders 107, etc. in thermal connection (thermal storage) with the storage system 103.

SUMMARY

The Applicant has observed that the present energy storage/accumulation systems do not have characteristics that allow an economically convenient use thereof in different situations.

In particular, in some cases (e.g. PHS and CAES) the systems require geomorphological situations that are very particular and hard to find. In some cases (e.g. PHS) the attainment of said systems requires making artificial basins with significant environment impact.

In other cases (AA-CAES), the attainment of thermal energy storage systems has problems that are hard to resolve at low cost and moreover there remains the need to find suitable subterranean caves. This also involves difficulties in obtaining satisfactory Round Trip Efficiencies (RTE). In any case there remains the problem of working with variable pressures in the storage tank, without combining the CAES system with the PHS system, with obvious further complication of costs and for identifying the correct geological conditions.

The Applicant has further observed that the attempts to make superficial CAES systems have met with difficulty due the practical impossibility to make the pressurized air storage tanks with a competitive cost in order to allow the feasibility of the systems themselves.

The Applicant has further observed that the attempts to make LAES systems have at the moment not allowed developing economically convenient systems, also due to the intrinsic problems of working in cryogenic conditions, also tied to the high pressures typical of all the cryogenic systems known up to now, as amply described above. The problems of producing cryogenic fluids, through processes of pressurization and thermal exchange at high pressure and subsequent depressurization and storage of the cryogenic fluid and also of the cryogenic energy, in suitable tanks and other costly expedients render the technology difficult to optimize with regard to costs. In addition, the cryogenic expander provided in the process is a component that is hard to produce.

The Applicant had furthermore observed that the attempts to make PHES systems with nearly-reversible Rankine cycles have considerable difficulties in obtaining satisfactory Round Trip Efficiencies (RTE) (i.e. higher than 60%) and simultaneously having reasonable costs, since the RTE is tied to the temperature differences in the apparatuses.

In the same manner, the PHES systems based on Brayton cycle have encountered difficulties since said systems use a compressor and a turbine for each cycle, both charging and discharging. This involves greater investments, but also greater irreversibility that can be compensated for by obtaining high RTEs only by maintaining very high temperature differences between hot and cold storage.

In such context, the Applicant has ideated and attained a process and a plant for energy storage, i.e. an "energy storage" system, which (objectives):
- can be attained in different geomorphological situations, does not require particular geographical or territorial conditions in order to be achieved and which possibly, in certain sizes, can also be used for sea/off-shore applications;
- has a smaller use of ground, in terms of m²/kWh stored;
- is capable of obtaining high RTEs, in any case higher than 70% and up to 75%;
- is capable of working with adjustable pressures in the storage tanks;
- is simple and inexpensive, preferably with the target of having an attainment cost lower than 100 USD/kWh and, in particular, which allows storage under pressure and with high energy density (in terms of $kWh_{stored}/m^3_{storage}$);
- is safe and compatible with the environment, for example it does not use particularly dangerous fluids;
- is modular;
- is compact;
- is durable, with an increased useful lifetime of up to 30 years;
- can be combined with energy recovery systems;
- can be combined with systems for producing energy with combustion in order to attain flexible energy production systems;
- is flexible and capable of quickly starting operation;
- can be easily and inexpensively maintained;
- is corrosion-resistant (in particular for sea applications);
- has a low level of vibrations and noise.

The Applicant has found that the above-indicated objectives and still others can be achieved by means of a system for storing energy (Energy Storage) operating by means of cyclic thermodynamic transformations (TTC), first in one sense and then in the opposite sense, between two storages of a work fluid in two separate environments/tanks of which one (that at lower pressure) is atmospheric or under pressure, in which a storage temperature is close to the critical temperature of the work fluid and in which such critical temperature is lower than 0° C.

In one independent aspect, the present invention regards a process for energy storage comprising:
- actuating a Cyclic Thermodynamic Transformation, first in one sense in a storage configuration/step and then in an opposite sense in a discharge configuration/step, between a basin for storing a work fluid, having a critical temperature lower than 0° C., and a tank for storing said work fluid in at least partly liquid or super-critical phase with a storage temperature close to the critical temperature; wherein in the storage step the process stores heat and potential energy in the form of pressure and generates energy in the discharge step;
- wherein, in the storage step, first sensible heat and subsequently latent heat are removed from the work fluid by means of at least one heat carrier, in order to store in the tank said work fluid in the at least partly liquid or super-critical phase and with said storage temperature;
- wherein, in the discharge step, first latent heat and subsequently sensible heat are transferred to the work fluid by means of said at least one heat carrier.

In one independent aspect, the present invention regards a plant for energy storage, comprising:
- a work fluid having a critical temperature lower than 0° C.;
- a basin for the work fluid;
- at least one tank configured to store said work fluid in an at least partly liquid or super-critical phase with a storage temperature close to the critical temperature; pipes operatively interposed between the basin and the tank and connecting, directly and/or indirectly, the basin with the tank; in which the pipes delimit: at least one storage path extended from the basin to the tank, at least one discharge path extended from the tank to the basin;
- at least one expander arranged along the pipes and configured for expanding the work fluid;
- at least one compressor arranged along the pipes and configured for compressing the work fluid;
- at least one operating/drive machine operatively connected to the expander and to the compressor;
- at least one thermal store arranged along the pipes and operatively interposed between the compressor and the tank and between the tank and the expander; wherein the plant is configured for actuating a Cyclic Thermodynamic Transformation with the work fluid, first in one sense in a storage configuration and then in an opposite sense in a discharge configuration, between said basin and said tank;
- wherein said at least one thermal store, in the storage configuration, is configured for absorbing first sensible heat and subsequently latent heat from the work fluid, so as to store said work fluid in the at least partly liquid or super-critical phase at said storage temperature;
- wherein said at least one thermal store, in the discharge configuration, is configured for transferring latent heat and subsequently sensible heat to the work fluid.

The Applicant has verified that the invention allows obtaining the above-listed objects.

Aspects of the invention are listed hereinbelow.

In one aspect, the plant according to the preceding aspect or according to one or more of the following aspects is configured for actuating the process according to the preceding aspect or according to one or more of the following aspects.

In one aspect, the process according to the preceding aspect or according to one or more of the following aspects is configured for being actuated by the plant according to the preceding aspect or according to one or more of the following aspects.

In one aspect, the storage step comprises: compressing the work fluid before removing the sensible heat and the latent heat from said work fluid and subsequently storing the work fluid in the tank at a storage pressure substantially equal to or close to an end compression pressure.

In one aspect, the discharge step comprises: expanding the work fluid after having transferred the latent heat and the sensible heat to said work fluid and without any increase of pressure before the expansion.

In one aspect, in the storage step, the sensible heat is removed by means of a first heat carrier and the latent heat is removed by means of a second heat carrier and, in the discharge step, the latent heat is transferred by means of the second heat carrier and the sensible heat is transferred by means of the first heat carrier.

In one aspect, the work fluid is single-component, optionally nitrogen or oxygen or methane, or a mixture, optionally air or natural gas.

In one aspect, the basin is at a substantially constant pressure, optionally in which the basin is the atmosphere.

In one aspect, the critical temperature of the work fluid is lower than −70° C., optionally lower than −100° C., optionally lower than −150° C., optionally lower than −180° C., optionally lower than −200° C.

In one aspect, an outlet of the compressor is directly connected to said at least one thermal store, without any throttle/expansion member interposed between the compressor and the thermal store.

In one aspect, said at least one thermal store is directly connected to an inlet of the expander, without any pump interposed between the thermal store and the expander.

In one aspect, said at least one thermal store comprises:
a first section configured for transferring sensible heat to the work fluid or for absorbing sensible heat from the work fluid; and
a second section configured for transferring latent heat to the work fluid or for absorbing latent heat from the work fluid.

In one aspect, said at least one thermal store comprises: at least one first thermal store arranged along the pipes and operatively interposed between the compressor and the tank and between the tank and the expander, wherein the first thermal store is configured for transferring sensible heat to the work fluid or for absorbing sensible heat from the work fluid.

In one aspect, said at least one thermal store comprises: at least one second thermal store arranged along the pipes and operatively interposed between the first thermal store and the tank or at least partially integrated in the tank, wherein the second thermal store is configured for transferring latent heat to the work fluid or for absorbing latent heat from the work fluid.

In one aspect, the basin is the atmosphere and the work fluid is air.

In one aspect, said at least one expander is a compressed air user machine, optionally part of an iron and steel plant or of an air separation unit (ASU).

In one aspect, the plant comprises a device for the carbon dioxide capture present in the work fluid.

In one aspect, said device for the carbon dioxide capture is operatively coupled to the pipes through which the work fluid flows.

In one aspect, said device for the carbon dioxide capture is operatively coupled to or integrated in said at least one thermal store, optionally wherein said device for the carbon dioxide capture is coupled to the or integrated in the first thermal store.

In one aspect, the device for the carbon dioxide capture comprises a tank for the work fluid.

In one aspect, the tank for the work fluid is in fluid connection with the pipes.

In one aspect, the tank for the work fluid is part of the first thermal store.

In one aspect, the device for the carbon dioxide capture comprises elements configured for cooling the mixture and solidifying the carbon dioxide.

In one aspect, the device for the carbon dioxide capture comprises a system, optionally mechanical, for extracting from the tank the carbon dioxide solidified in said tank.

In one aspect, said at least one expander comprises a single expander or a plurality of expanders.

In one aspect, the expander comprises at least one turbine or a plurality of turbines.

In one aspect, the expander comprises a plurality of interheated expanders.

In one aspect, said at least one compressor comprises a single compressor or a plurality of compressors.

In one aspect, the compressor comprises at least one turbocompressor.

In one aspect, said at least one compressor comprises a plurality of intercooled compressors.

In one aspect, said at least one thermal store comprises at least one heat exchanger operatively coupled to the pipes or to the work fluid.

In one aspect, said at least one thermal store comprises at least one heat carrier directly or indirectly coupled or couplable to the work fluid.

In one aspect, said at least one thermal store, optionally said second thermal store, comprises a heat carrier housed in the tank.

In one aspect, said at least one thermal store, optionally said first thermal store, also comprises exchangers operatively interposed between successive compressors or successive compression stages of said at least one compressor, for absorbing heat from the work fluid between one compression and the next in the storage configuration/step.

In one aspect, said at least one thermal store, optionally said first thermal store, also comprises exchangers operatively interposed between successive expanders or successive expansion stages of said at least one expander, for transferring heat to the work fluid between one expansion and the next in the discharge configuration/step.

In one aspect, said at least one operating/drive machine comprises a drive machine which supplies mechanical energy to said at least one compressor, i.e. which actuates the compressor.

In one aspect, the drive machine is electric.

In one aspect, in the storage step, the drive machine functions as a motor, absorbing electrical energy and actuating said at least one compressor.

In one aspect, the compression is adiabatic or intercooled.

In one aspect, the end compression pressure is comprised between 15% and 130% of a critical pressure of the work fluid, optionally between 30% and 80% of the critical pressure.

In one aspect, by means of the removal of the sensible heat from the work fluid, said work fluid is cooled to a temperature close to a saturation temperature at the corresponding pressure.

In one aspect, the sensible heat removed from the work fluid is stored.

In one aspect, the removal of the sensible heat from the work fluid is actuated by means of direct or indirect exchange with said at least one heat carrier.

In one aspect, by means of the removal of the latent heat from the work fluid, said work fluid is condensed.

In one aspect, in the storage configuration/step, the condensation occurs at constant or variable pressure.

In one aspect, the removed latent heat from the work fluid is stored.

In one aspect, the removal of the latent heat from the work fluid is actuated by means of direct or indirect exchange with said at least one heat carrier.

In one aspect, said at least one thermal store is of the type with direct or indirect thermal exchange.

In one aspect, the first thermal store and/or the second thermal store is/are with direct or indirect thermal exchange.

In one aspect, the work fluid is stored in the tank in totally liquid phase.

In one aspect, the work fluid is stored in the tank only partially in liquid phase.

In one aspect, the storage of the work fluid in the at least partly liquid or super-critical phase occurs in the absence of throttle after the compression.

In one aspect, the compression starts with a pressure of the work fluid lower than a critical pressure of said work fluid.

In one aspect, if the storage pressure is lower than the critical pressure, the condensation of the work liquid occurs only via removal of latent heat.

In one aspect, if the final storage pressure is higher than the critical pressure, and optionally lower than about 1.3 times said critical pressure, the condensation occurs by transfer of latent heat up to at least 70%-90% of the fill of the tank, instead exchanging with a small temperature difference only in the final charge transient step; the exchange of latent heat is still prevalent.

In one aspect, in the storage configuration/step, a single flow is present without recirculations of the work fluid between the environment and the tank.

In one aspect, the discharge step comprises the transfer of the heat by said at least one heat carrier and the absorption of the latent heat by the work fluid so as to evaporate and/or overheat said work fluid.

In one aspect, in the discharge configuration/step, the evaporation of the work fluid occurs at constant or variable pressure.

In one aspect, in the storage configuration/step, the condensation of the work fluid occurs at constant or variable pressure.

In one aspect, the evaporation of the work fluid occurs up to a pressure lower than the storage pressure.

In one aspect, the discharge step comprises the transfer of the heat by said at least one heat carrier and the absorption of the sensible heat by the work fluid so as to heat said work fluid.

In one aspect, in the discharge step, the drive machine is actuated by the expander and functions as a generator, producing mechanical or electrical energy.

In one aspect, a pressure of the work fluid in the storage step and before compression is equal or substantially equal to a pressure of the work fluid in the discharge step and at the end of expansion.

In one aspect, a storage pressure in the storage step is higher than a storage pressure in the discharge step.

In one aspect, a difference between the storage pressure in the storage step and the storage pressure in the discharge step is comprised between 2 bar and 20 bar.

In one aspect, in the discharge step, from the tank to the inlet of the expander, pressures of the work fluid are lower than pressures of the work fluid in the storage step, from the outlet of the compressor to the tank.

In one aspect, the latent heat and/or sensible heat absorbed by the work fluid in the discharge step is/are higher than or equal to the latent heat and/or sensible heat transferred by the work fluid in the storage step.

In one aspect, evaporation pressures of the work fluid, during evaporation, are comprised between 99% and 20%, optionally between 90% and 70%, of the condensation pressure.

In one aspect, in the discharge configuration/step, a single flow is present without recirculations of the work fluid between the tank and the environment.

In one aspect, if the work fluid is a mixture, said work fluid has a variable composition over time, at least during the discharge step.

In one aspect, said at least one heat carrier can be of liquid type, solid type, with phase change, chemical type.

In one aspect, a temperature of the work fluid in the storage step and just before the removal of the latent heat from the work fluid is higher than or equal to a temperature of said work fluid in the discharge step and at the end of the transfer of the latent heat to said work fluid.

In one aspect, a temperature of the work fluid in the tank at the end of the storage step is higher than a temperature of the work fluid in the tank at the start of the discharge step.

In one aspect, in the discharge step, it is provided to transfer additional heat to the work fluid, before expanding said work fluid.

In one aspect, the additional heat is supplied by a source of internal heat or external heat.

In one aspect, an additional heat exchanger is operatively placed on the discharge path and placed at least between said at least one thermal store and said at least one expander, in which the additional heat exchanger is operatively coupled to a source of external heat.

In one aspect, an additional heat exchanger is operatively interposed between successive expanders or successive expansion stages.

In one aspect, at least one combustion chamber is operatively placed on the discharge path and placed at least between said at least one thermal store and said at least one expander, in which the work fluid flows through the combustion chamber and receives heat from the combustion generated in said combustion chamber.

In one aspect, a combustion chamber is operatively interposed between successive expanders or successive expansion stages.

In one aspect, the discharge step is recuperative, in order to preheat the work fluid before the expansion.

In one aspect, a recuperator operatively couples a first portion of the discharge path placed between said at least one thermal store and said at least one expander with a second portion of the discharge path placed between said at least one expander and the basin, in order to preheat the work fluid before the expansion.

In one aspect, a cycle a "bottoming" system is operatively coupled to the process in the discharge step, optionally after the expansion, or to the discharge path of the plant, optionally between said at least one expander and the basin, in order to recover residual heat from expander discharge.

In one aspect, in the discharge step, it is provided to re-compress, optionally by means of intercooled re-compression, the work fluid before the expansion.

In one aspect, at least one auxiliary compressor, optionally intercooled, is placed on the discharge path and upstream of said at least one expander, in order to re-compress the work fluid before the expansion.

Further characteristics and advantages will be clearer from the detailed description of preferred but not exclusive embodiments of a plant and of a process for energy storage in accordance with the present invention.

DESCRIPTION OF THE DRAWINGS

Such description will be set forth hereinbelow with reference to the enclosed drawings, provided only as a non-limiting example, in which.

DETAILED DESCRIPTION

Figure 1:
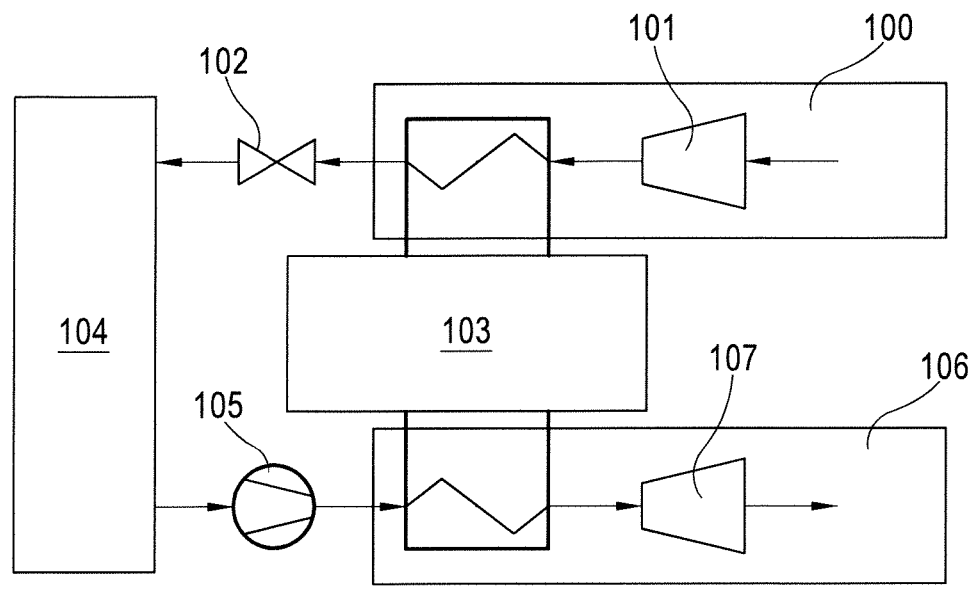
FIG. 1 illustrates a diagram of the plants according to the Prior Art.
Figure 2:
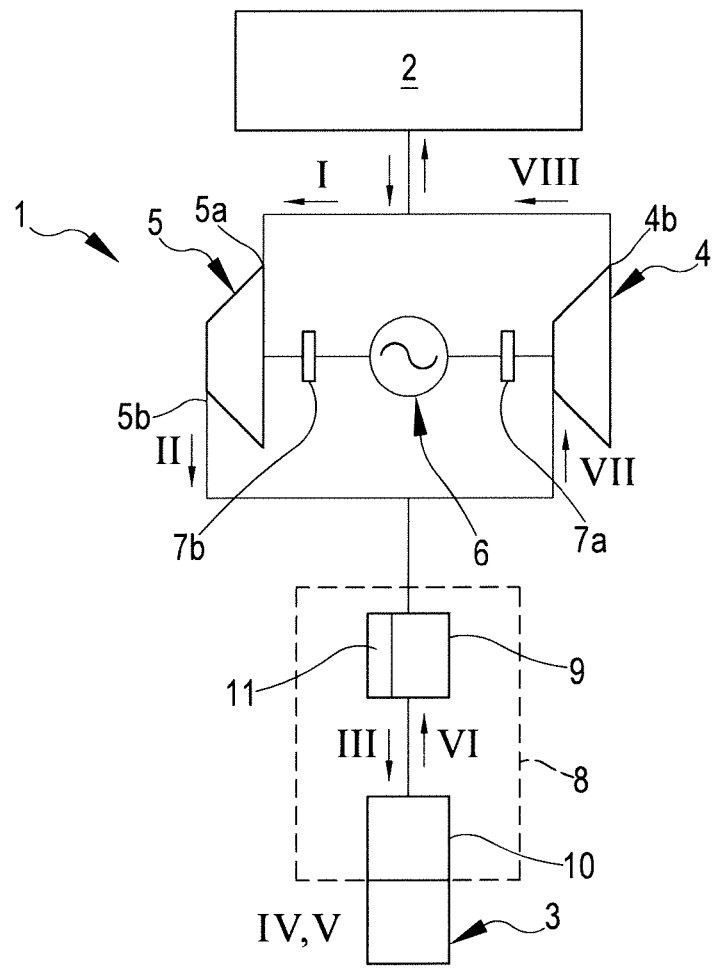
FIG. 2 illustrates a general diagram of the plant for energy storage according to the present invention.

With reference to the enclosed Figures starting from FIG. 2, reference number 1 overall indicates a plant for energy storage according to the present invention.

The plant 1 comprises a basin 2 in which a work fluid at a constant or substantially constant pressure is present or can be stored. The basin 2, represented schematically as a rectangle in FIG. 2, can be a closed environment or it can be the terrestrial atmosphere. The work fluid is part of the plant 1 and can be the atmospheric air or a different fluid, single-component, such as nitrogen or oxygen or methane, or a mixture, such as natural gas. A particular characteristic of the abovementioned work fluid is that it has a critical temperature $T_c$, lower than 0° C.

For example, if the work fluid is air, the critical temperature $T_c$ is about −140° C. (140° C. below 0°), if the work fluid is methane, the critical temperature $T_c$ is about −83° C. (83° C. below 0°), if the work fluid is argon, the critical temperature $T_c$ is about −122° C. (122° c. below 0°).

The plant 1 comprises a tank 3 configured to store the work fluid in an at least partly liquid or super-critical phase with a storage temperature close to its critical temperature $T_c$.

Pipes, defined for example by tubes and/or conduits made in another manner, are operatively interposed between the basin 2 and the tank 3 and connect, directly and/or indirectly, the basin 2 with the tank 3. Such pipes delimit a storage path which is extended from the basin 2 to the tank 3 and a discharge path which is extended from the tank 3 to the basin 2.

The plant 1 comprises an expander 4, a compressor 5 and an operating/drive machine 6, which in FIG. 2 is represented as an electric motor-generator, operatively connected to the expander 4 and to the compressor 5. The expander 4 is configured for expanding the work fluid; the compressor 5 is configured for compressing the work fluid. In FIG. 2, the compressor 5 is represented as a turbo-compressor, the expander 4 is a turbine. In embodiment variants, the expander 4 can be any one compressed air user machine, for example part of an iron and steel plant or of an air separation unit (ASU). In embodiment variants, the operating machine and the drive machine can be separate machines. The drive machine is mechanically connected to the compressor 5 and actuates the compressor 5. The operating machine is mechanically connected to the expander 4 and is actuated by the expander 5, producing mechanical and/or electrical energy.

The basin 2 is in fluid communication, by means of the pipes, with an inlet 5a of the compressor 5. The basin 2 is also in fluid communication, by means of the pipes, with an outlet 4b of the expander 4. The electric motor-generator 6 is mechanically connected/connectable to rotation shafts of the compressor 5 and of the expander 4 by means of respective clutches 7a, 7b.

The plant 1 comprises a thermal store 8 arranged along the pipes and operatively interposed between the compressor 5 and the tank 3 and between the tank 3 and the expander 4. According to that illustrated in FIG. 2, the thermal store 8 comprises a first thermal store 9 and a second thermal store 10 arranged in series.

The first thermal store 9 is in fluid communication, by means of the pipes, with an outlet 5b of the compressor 5 and with an inlet 4a of the expander 4. The second thermal store 10 is in fluid communication, by means of the pipes, with the first thermal store 9 and is placed downstream of the latter.

The second thermal store 10 is physically placed upstream of the tank 3 or it is at least partly integrated in said tank 3.

The first thermal store 9 is configured for exchanging sensible heat with the work fluid, in particular for absorbing sensible heat from the work fluid, in order to store said absorbed heat and in order to newly transfer said sensible heat to the work fluid, as a function of the operating configuration of the plant 1.

The second thermal store 10 is configured for exchanging latent heat with the work fluid, in particular for absorbing latent heat from the work fluid, in order to store said absorbed heat and in order to newly transfer said latent heat to the work fluid, as a function of the operating configuration of the plant 1.

In possible embodiment variants, there is only one thermal store but it has distinct sections: a first section configured for transferring sensible heat to the work fluid or for absorbing sensible heat from the work fluid and a second section configured for transferring latent heat to the work fluid or for absorbing latent heat from the work fluid.

The plant 1, in accordance with the process for energy storage according to the invention, is configured for actuating a Cyclic Thermodynamic Transformation TTC with the work fluid, first in one sense, in a storage configuration, from the basin 3 to the tank 2, and then in an opposite sense, in a discharge configuration, from the tank 3 to the basin 2.

In the storage configuration, the plant 1 is configured for absorbing first the sensible heat and subsequently the latent heat from the work fluid, so as to store, in the tank 3, said work fluid in at least partly liquid or super-critical phase at a storage temperature close to the critical temperature (lower than 0°) of said work fluid. In the discharge configuration, the plant 1 is configured for transferring the latent heat and subsequently the sensible heat to the work fluid. In the storage step, the process/plant 1 stores heat and potential energy in the form of pressure and generates energy in the discharge step.

Figure 3:
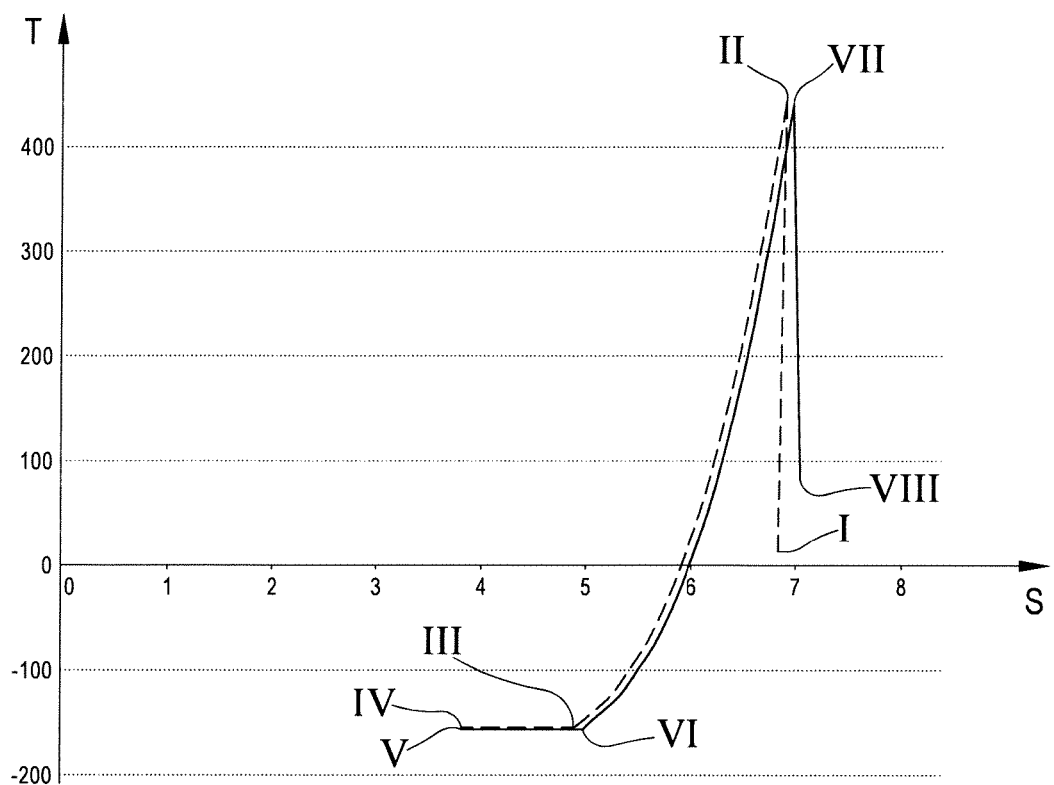
FIG. 3 is a T-S diagram illustrating a transformation according to the process for energy storage of the present invention.
Figure 4:
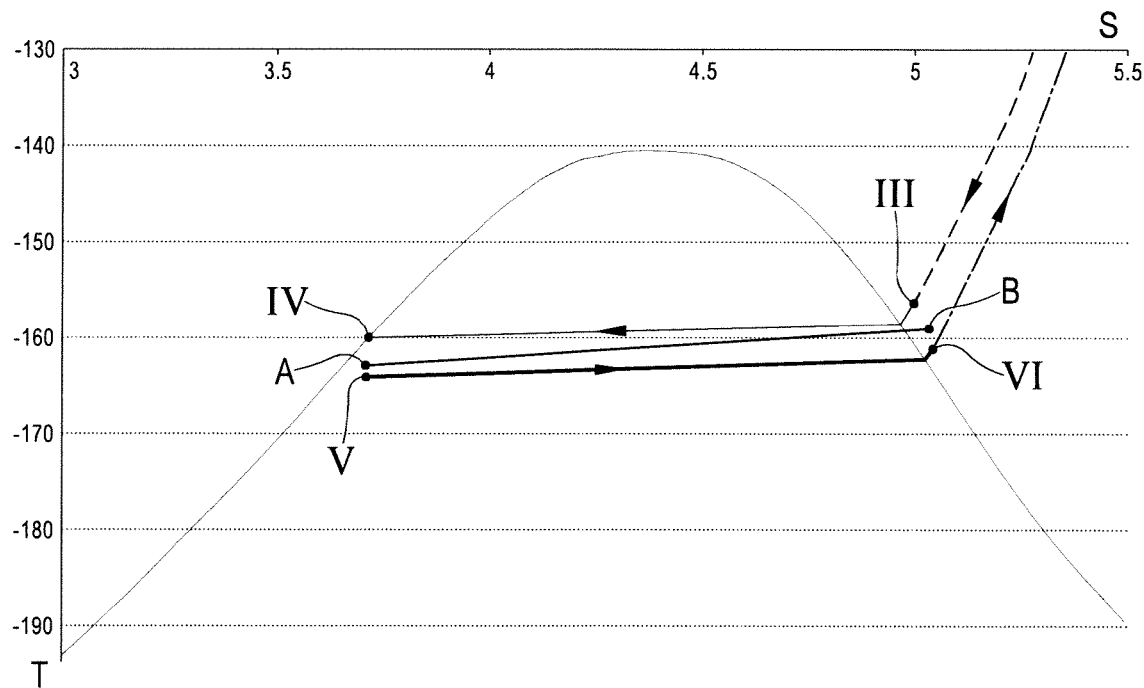
FIG. 4 is an enlargement of a part of the diagram of FIG. 3.

More in detail and with reference to FIGS. 2, 3 and 4, in the storage configuration/step, the work fluid present in basin 2 (point I), e.g. atmospheric air, is suctioned by the compressor 5, compressed (from I to II) and sent to the first thermal store 9.

At the inlet 5a of the compressor 5, a system of filters and an air purification system can be present, not illustrated in the enclosed Figures.

An end compression pressure, i.e. at a pressure of the work fluid at the outlet of the compressor 5, is comprised for example between 30% and 80% of the critical pressure. The mechanical energy which moves the compressor 5 is supplied by the motor-generator 6 which functions as electric motor and absorbs electrical energy. The compression can be adiabatic or intercooled.

At the first thermal store 9, the compressed work fluid exchanges heat with a first heat carrier belonging to the first thermal store 9 or operatively coupled to the first thermal store 9. For example, the first thermal store 9 comprises a heat exchanger operatively coupled to the pipes or to the work fluid and to the first heat carrier.

The first heat carrier can be directly or indirectly coupled to the work fluid. In other words, the removal of the sensible heat from the work fluid can be actuated by means of direct or indirect exchange with the first heat carrier. The first heat carrier can be of liquid type, solid type, with phase change, chemical type, etc..

The work fluid is then cooled by means of the removal of the sensible heat from said work fluid (from II to III) and such heat is stored in the first thermal store 9, for example it is stored in the same first heat carrier. By means of the removal of the sensible heat from the work fluid, the work fluid is cooled to a temperature close to a saturation temperature at the corresponding pressure.

The cooled work fluid flows towards the second thermal store 10 and towards the tank 3. At the second thermal store 10, the work fluid transfers—to a second heat carrier—latent heat or transfers in part sensible heat and in part latent heat (from III to IV) and is stored in the tank 3. The heat removed from the work fluid is stored in the second thermal store 10.

The second thermal store 10 can be of the type with direct or indirect thermal exchange, so that the removal of the latent heat from the work fluid is actuated by means of direct or indirect exchange with said second heat carrier. For example, the second thermal store 9 comprises at least one heat exchanger operatively coupled to the pipes or to the work fluid and to the second heat carrier.

The second thermal store 10 can be at least partly integrated in the tank 3. In one embodiment, the second thermal store 10 for example comprises a heat exchanger inserted in the tank 3. The heat exchanger is operatively coupled to the second heat carrier and to the work fluid contained in the tank 3. In a different embodiment, the second heat carrier is directly housed in the tank 3. The second heat carrier can be of liquid type, solid type, with phase change, chemical type, etc..

The removed latent heat is stored in the second thermal store 10, for example it is stored in the same second heat carrier.

In the storage configuration, a single flow without recirculations of the work fluid flows from the environment 2 to the tank 3.

As a function of the operative parameters of the specific process and/or of the properties of the work fluid, the latter can be stored in the tank 3 in totally liquid phase, partially liquid phase (i.e. the work fluid is at least partly condensed) or slightly super-critical phase. In case of storage in slightly super-critical phase, there is a transfer of heat with temperature variation but with very high $C_p$, since it is close to the critical point.

In the storage configuration/step, the condensation can occur at constant or variable pressure.

The storage of the thermal energy by the second thermal store 10 thus occurs via removal of "latent" heat also in the supercritical case, where—even if it is desired to work at constant pressure in the storage tank 3—inevitably up to the completion of the loading of the tank, the initial pressure will be slightly subcritical and therefore the removal of the heat is in any case mainly of latent type. In other words, one starts from a subcritical condition in order to terminate in a supercritical condition by exploiting a higher temperature jump. This allows reducing the dimensions of the second thermal store 10.

If the storage pressure is lower than the critical pressure, the condensation of the work liquid occurs only via removal of latent heat. If the final storage pressure is higher than the critical pressure, and optionally lower than about 1.3 times said critical pressure, the condensation occurs by transfer of latent heat up to at least 70%-90% of the fill of the tank 3, instead exchanging with a small temperature difference only in the final charge transient step.

The outlet 5b of the compressor 5 is directly connected to the first thermal store 9 and between the compressor 5 and the tank 3 there is no throttle valve, so that the storage pressure in the tank 3 is substantially equal to or close to the end compression pressure.

In the discharge configuration/step (FIGS. 2, 3 and 4), the pressure of the work fluid present in the tank 3 is reduced from IV to V. The work fluid absorbs the heat, latent or mainly latent, stored in the second heat carrier of the second thermal store 10. The work fluid evaporates and/or is overheated to a pressure lower than the storage pressure (point VI). In the discharge configuration/step, the evaporation of the work fluid can occur at constant or variable pressure. If the work fluid is a mixture, such as air, said work fluid can also have a variable composition over time during the discharge step, since the lighter component of the mixture in terms of molar mass will tend to evaporate "first" or with a higher percentage.

The work fluid passes through the first thermal store 9, where it absorbs sensible heat from the first heat carrier and is heated up to point VII, and then it transits through the expander 4 which exploits the enthalpy jump of the work fluid from point VII to point VIII. The expander 4 actuates the motor-generator 6, which works as electric generator and converts the mechanical energy into electrical energy.

In the discharge configuration/step, a single flow without recirculations of the work fluid flows from the tank 3 to the environment 2.

The inlet 4a of the expander 4 is directly connected to the first thermal store 9 without any pump interposed therebetween, so that there is no increase of pressure between the tank 3 and the expander 4 in the discharge step.

In FIG. 4, the line A-B is observed which represents the second heat carrier which starts from an initial condition (point A) of start storage step and reaches a final condition (point B) at end storage; the opposite takes place during the discharge step.

It is observed that:

a pressure of the work fluid in the storage step and before compression is equal or substantially equal to a pressure of the work fluid in the discharge step and at the end of expansion;

a storage pressure in the tank 3 in the storage step is higher than a storage pressure in the tank 3 in the discharge step; for example, a difference between the storage pressure in the storage step and the storage pressure in the discharge step is comprised, for example, between 0.1 bar and 30 bar, optionally between 0.5 bar and 3 bar;

in the discharge step, from the tank to the inlet of the expander, pressures of the work fluid are lower than pressures of the work fluid in the storage step, from the outlet of the compressor to the tank; it is indicated that the pressures in the discharge step are lower than the pressures in the storage step but as close as possible to each other in order to optimize the Round Trip Efficiency (RTE) of the plant/process; for example, a difference between the pressures in the storage step and the pressures in the discharge step is comprised, for example, between 0.5 bar and 20 bar, optionally between 0.5 bar and 5 bar.

evaporation pressures of the work fluid, during the evaporation, are comprised between 99% and 20%, optionally between 90% and 70%, of the condensation pressure;

a temperature of the work fluid in the storage step and just before the removal of the latent heat from the work fluid (point III) is higher than or equal to a temperature of said work fluid in the discharge step and at the end of the transfer of the latent heat to said work fluid (point VI).

a temperature of the work fluid in the tank at the end of the storage step (point IV) is higher than a temperature of the work fluid in the tank at the start of the discharge step (point V);

the latent heat and/or sensible heat absorbed by the work fluid in the discharge step is/are higher than or equal to the latent heat and/or sensible heat transferred from the work fluid in the storage step; it derives that the Cyclic Thermodynamic Transformation TTC behaves as a cooling cycle.

As can be observed, the lines of condensation and evaporation are not horizontal (i.e. at constant temperature) since the work fluid is air, which is a mixture of fluids that are different from each other. If the work fluid was "pure", the lines of condensation and evaporation would be horizontal and the condensation/evaporation would occur at constant temperature.

Figure 5:
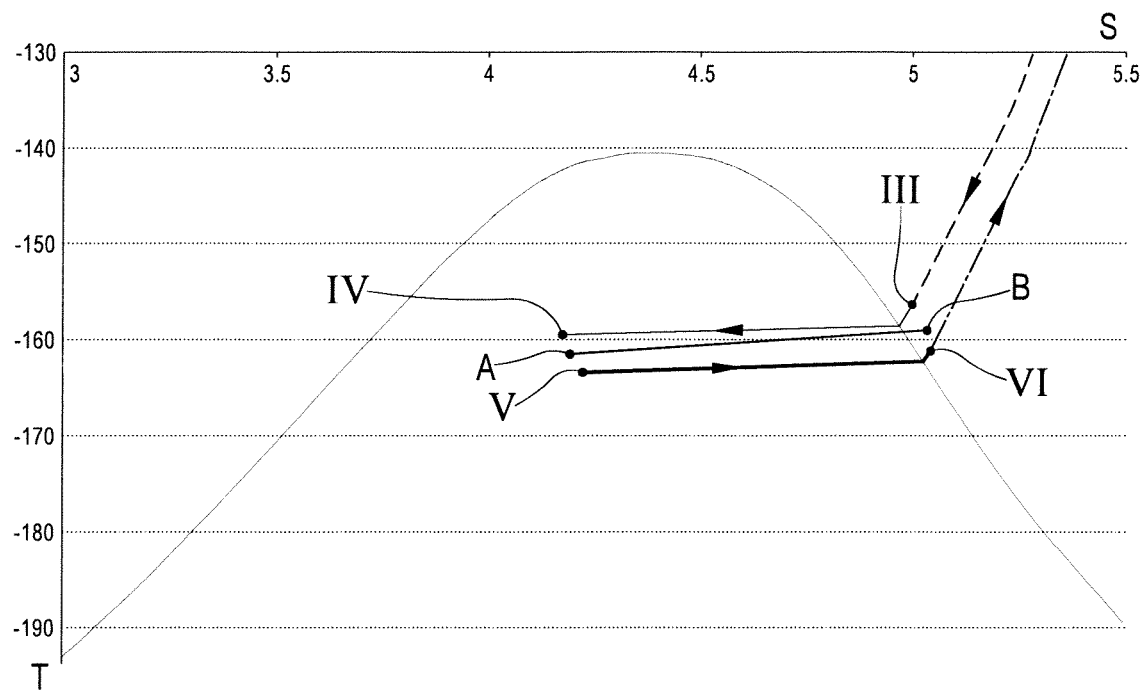
FIG. 5 illustrates the enlargement of FIG. 4 according to a variant of the transformation.

FIG. 5 illustrates a variant of the process in which points IV and V, respectively at end storage step and start discharge step, are not in total liquefaction. This variant can be useful for the purpose of optimizing the ratio (given the same stored energy) between the volume of the tank 3 and the quantity of the material necessary (liquid, solid, with phase change, chemical, etc.) for the storage of the latent heat (i.e. the second heat carrier in the second thermal store 10). Indeed, by completing the charge with a two-phase situation in the tank 3, the volume required for the storage of the work fluid under pressure increases, but a reduction of the latent heat to be removed is obtained.

Figure 6:
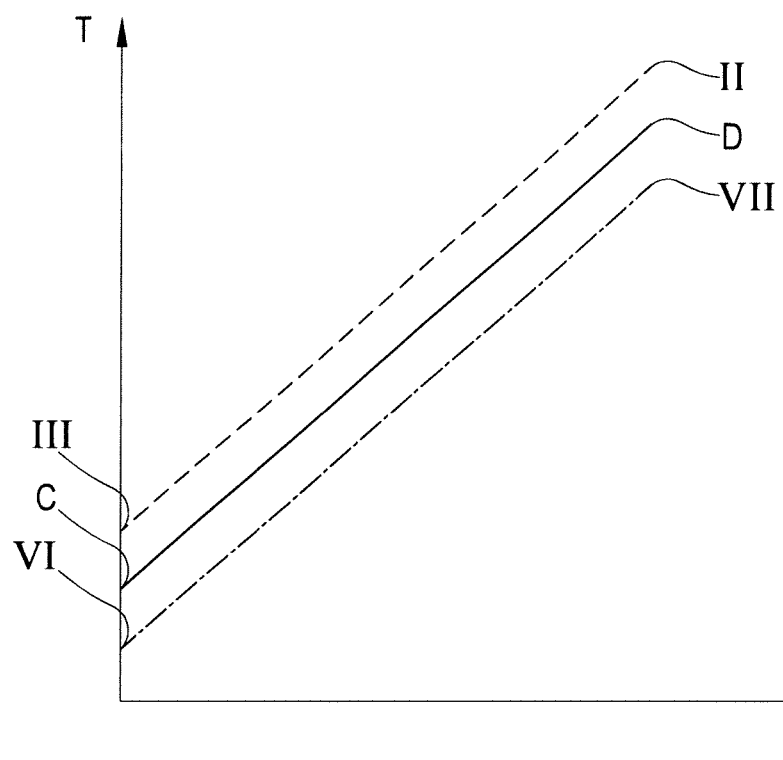
FIG. 6 is a T-Q diagram illustrating the thermal exchange in a first thermal store of the plant of FIG. 2.

FIG. 6 illustrates a T-Q diagram relative to the exchanges of heat operated by means of the first thermal store 9 during the storage step and the discharge step.

In the storage step, the work fluid transfers the sensible heat, being cooled from point II to point III, while the first heat carrier used in order to store the sensible heat is heated, entirely or in part, from point C to point D.

In the discharge step, the work fluid is heated, absorbing sensible heat, passing from point VI to point VII, while the first heat carrier is cooled, passing from point D to point C. For the process to be attainable, the temperature at VI must be lower than or at most equal to the temperature at III and hence the pressure in the discharge step lower than or equal to the pressure in the storage step.

As already specified above, the thermal exchange in the first thermal store 9 can be made in different modes, including: indirect thermal exchange or direct thermal exchange.

An indirect system of thermal exchange can for example comprise a heat exchanger interposed between the work fluid and a fluid used as first heat carrier and/or as storage. The first heat carrier is stored from a condition that corresponds with point C (at the start of the storage step) to a condition that corresponds with point D (at the end of the storage step). The indirect system of thermal exchange comprises one (in this case it functions as a thermocline) or more tanks for the storage of the first heat carrier and/or alternatively a direct exchange storage system, i.e. a thermocline at whose interior there is a solid material with which the first heat carrier in turn transfers/absorbs the heat, with the objective of minimizing the fluid of the first heat carrier and reducing the dimensions of the tanks, increasing the thermal energy storage capacity.

A system of direct thermal exchange can be attained through a container/pressure vessel, a connection system connected to the process/interface with the rest of the system; fill material that constitutes the first heat carrier inserted within the pressure vessel. The fill material serves to absorb and transfer heat respectively during the storage step and discharge step.

Figure 7:
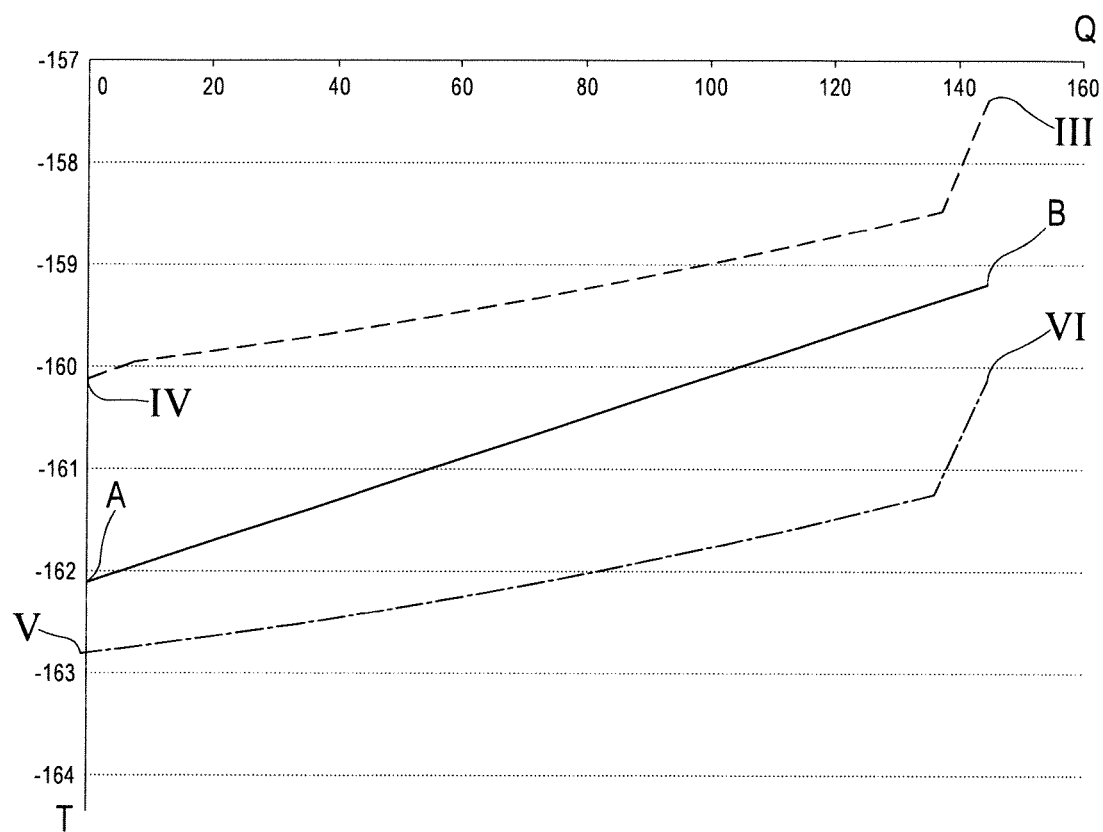
FIG. 7 is a T-Q diagram illustrating the thermal exchange in a second thermal store of the plant of FIG. 2.

FIG. 7 illustrates a T-Q diagram relative to the heat exchanges operated by means of the second thermal store 10 during the storage step and the discharge step.

In the storage step, the work fluid transfers the latent heat, being cooled from point III to point IV, while the second heat carrier in order to store the latent heat is heated from point A to point B. In the discharge step, the work fluid is heated by absorbing latent heat, passing from point V to point VI, while the second heat carrier is cooled, passing from point B to a point close to point A. By suitably adjusting the discharge pressure, i.e. evaporation pressure, it is possible to ensure that the latent heat absorbed for evaporating the work fluid during the discharge step is greater than or equal to the latent heat transferred from the work fluid to the second heat carrier during the storage step.

As already specified above, also the thermal exchange in the second thermal store 10 can be attained in different modes, including: indirect thermal exchange or direct thermal exchange.

If the latent heat is removed from the second heat carrier in an indirect manner, a system can for example be present that comprises heat exchanger interposed between the work fluid and a fluid used as second heat carrier and/or as storage. Such second heat carrier is stored from a condition that corresponds with point A (at the start of the storage step) to a condition that corresponds with point B (at the end of the storage step). The indirect exchange system comprises one (in this case it functions as thermocline) or more tanks for the storage of the second heat carrier and/or alternatively a direct exchange storage system ("modified" thermocline), i.e. a thermocline at whose interior there is a solid material with which the second heat carrier in turn transfers/absorbs the heat with the objective of minimizing the fluid of the second heat carrier and reducing the dimensions of the tanks, increasing the thermal energy storage capacity.

If the latent heat is removed from the second heat carrier in a direct manner, a system can be present comprising a container/pressure vessel, a connection system connected to the process/interface with the rest of the system; inert fill material (which constitutes the second exchange/thermal storage carrier) inserted within the pressure vessel. The tank 3 for the storage of the work fluid in liquid phase can be the same that contains the fill material. In such case, the work fluid occupies by gravity the interstices delimited by the fill material and the volume not occupied by the solid material, or it occupies a volume left empty for such purpose within the tank 3. Alternatively, the tank 3 and the container/pressure vessel can be separate elements.

In order to limit the quantity (and the relative costs) of the second heat carrier, two routes can be followed.

According to a first route, it is possible to increase the enthalpy difference between point A and point B by maintaining constant the pressures during the step of condensation and evaporation and further reducing the evaporation pressure. Indeed, by increasing the pressure difference between condensation and evaporation (reducing their ratio), an increase of temperature difference is obtained.

In accordance with a second route, by allowing a variable pressure during the step of condensation (and evaporation), in particular a pressure that increases with the increase of the mass of the work fluid to be stored, it is possible to reduce the necessary mass of the second heat carrier (or for storage of the latent energy) and thus the size of the second thermal store. Indeed, by reducing the mass but increasing the pressure during the storage step, it is possible to maintain an evaporation pressure, in discharge step, close to that of condensation without negatively affecting the efficiency. The storage step starts for example from 30% of the critical pressure and finishes at 80% of the critical pressure, while the discharge step starts from 75% of the critical pressure and finishes at 28% of the critical pressure, therefore the discharge step passes by points with pressure lower than the relative storage points, with a ratio of about 0.9-0.95. In addition, due to the reduction of specific latent heat for higher pressures, also the enthalpy difference of the work fluid between point III and point IV is reduced, contributing to the reduction of mass necessary for the condensation medium.

The plant 1, if it uses air as work fluid, can also be comprised or be coupled to a device 11 for the capture of the atmospheric carbon dioxide $CO_2$. Such device 11 is operatively coupled to the pipes in the sense that they are in fluid communication with the storage path and/or discharge path. Such device 11 can be operatively coupled to the thermal store 8.

If atmospheric air is used, there can also be a device for capturing and removing moisture ($H_2O$) and carbon dioxide $CO_2$ which otherwise—reaching the freezing point during the storage step, would create problems for the storage process.

For example, molecular sieves can be employed in which the water, the carbon dioxide and most of the other residue impurities are eliminated. There are two molecular sieves and they work alternately; when one is operating for purifying the air, typically at the intercooled outlet of a first compressor at low pressure, the other is regenerated. The reversal of the molecular sieves as well as their regeneration can be completely automated.

The device 11 for the carbon dioxide capture $CO_2$ can also be configured for reusing the recuperated carbon dioxide $CO_2$, e.g. in solid form, in advanced energy systems.

In one embodiment, such device 11 for the carbon dioxide $CO_2$ capture is integrated in the first thermal store 9 which stores the sensible heat, as schematically represented in FIG. 2. The first thermal store 9 works at temperatures lower than 0° C. and exploits the passage through the freezing point of $CO_2$ at the work pressure. Indeed, holding true the rule of the partial pressures, since the content of $CO_2$ in the air is equal to about 0.04%, within the first heat store 9 there is a passage of the carbon dioxide $CO_2$ from the gaseous state to the solid state and the carbon dioxide $CO_2$ is then separated from the rest of the mixture, which remains in the gaseous state, and extracted. Such device is thus configured for: solidifying the $CO_2$, separating the $CO_2$ from the mixture of air, extracting the solidified $CO_2$ (dry ice) from the device.

Figure 8:
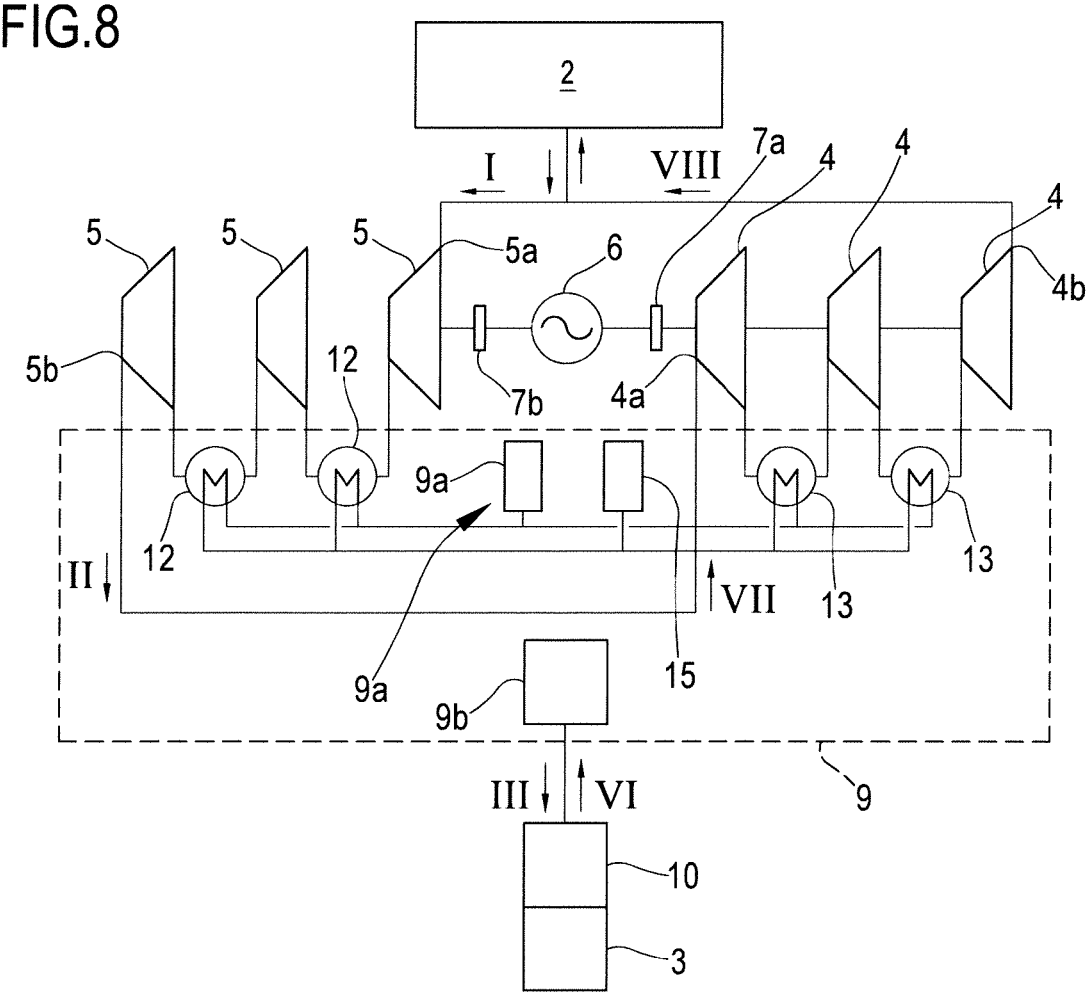
FIGS. 8, 10, 12, 14, 16, 18 each schematically illustrate an embodiment of the plant for energy storage according to the present invention.

FIG. 8 illustrates an embodiment of the plant 1 which comprises a plurality of turbocompressors 5 fluidically connected in series and a plurality of turbines 4 fluidically connected in series.

The first thermal store 9 comprises a first portion 9a provided with heat exchangers 12 interposed between two successive turbocompressors 5 and configured for absorbing sensible heat from the work fluid between successive compressions in the storage configuration/step. The turbocompressors and the relative compressions are therefore intercooled. The first portion 9a also comprises heat exchangers 13 interposed between two successive turbines 4 for transferring heat to the work fluid between one expansion and the next in the discharge configuration/step. The turbines 4 and the relative expansions are therefore interheated. The first thermal store 9 also comprises storage tanks 14, 15 of the first heat carrier (e.g. liquid) thereof in fluid connection, by means of suitable circuits, with the heat exchangers 12, 13. The first portion 9a of the first thermal store 9, in addition to storing the sensible heat, operates the inter-cooling and the inter-heating operations.

The first thermal store 9 comprises a second portion 9b which is placed downstream of the first portion 9a in the storage configuration/step and is placed upstream of the first portion 9a in the discharge configuration/step.

Figure 9:
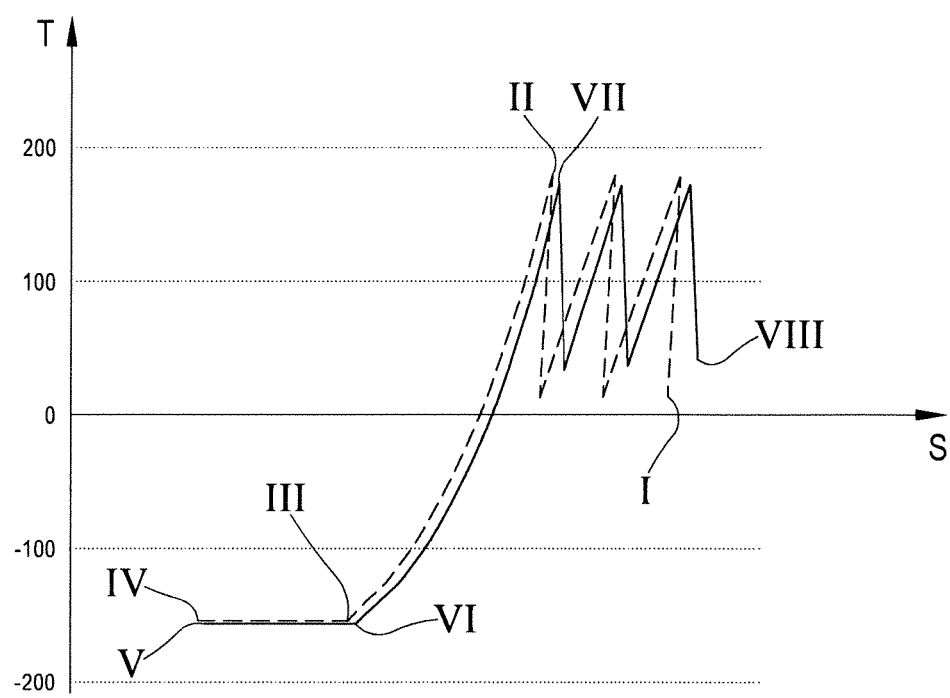
FIGS. 9, 11, 13, 15, 17, 19 each illustrate a T-S diagram relative to one of the plants of FIGS. 8, 10, 12, 14, 16, 18.

FIG. 9 illustrates the transformation of the plant of FIG. 8 in a T-S diagram, in which the intercooled compressions (from point I to II) are observed as well as the interheated expansions (from point VII to point VIII).

Figure 10:
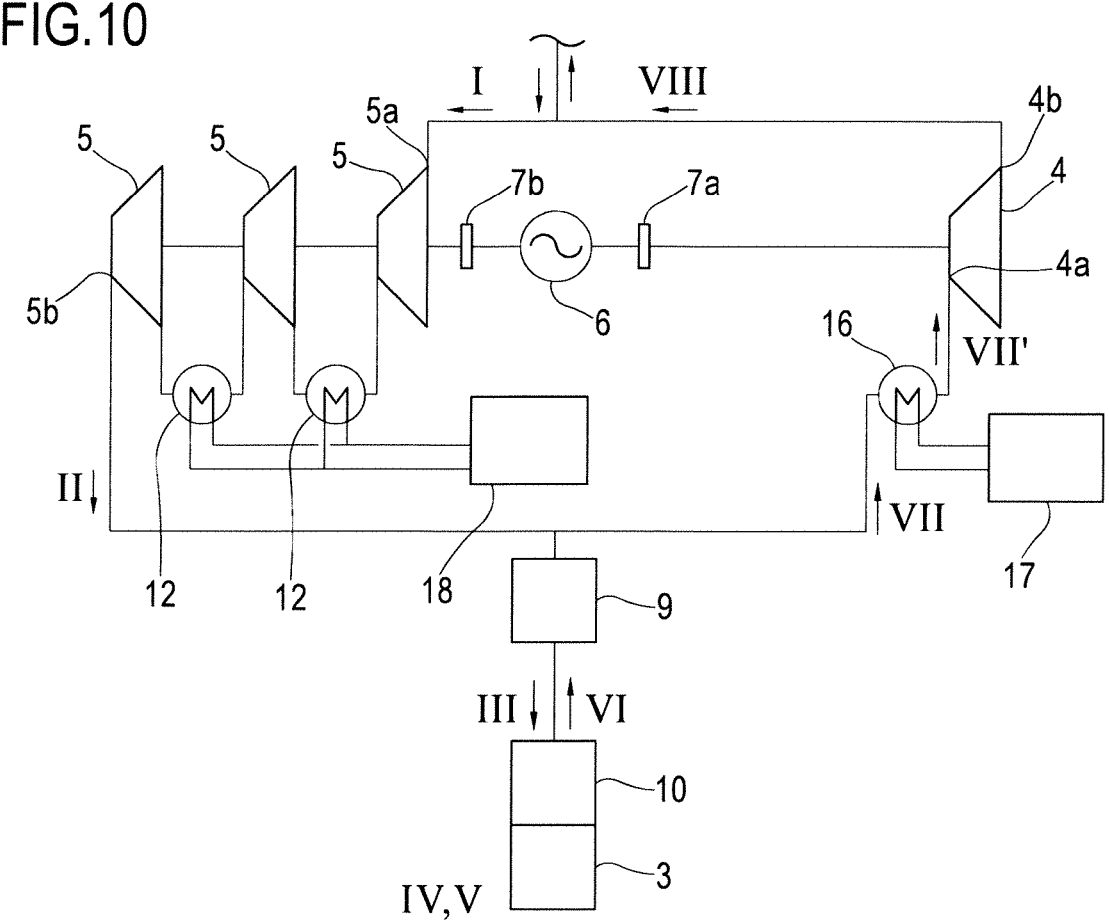

The embodiment of the plant 1 of FIG. 10 differs from that of FIG. 8 since it comprises an additional heat exchanger 16 operatively placed on the discharge path and placed between the first thermal store 9 and a single turbine 4 which is not interheated. The additional heat exchanger 16 is operatively coupled to a source of external heat 17 which, in the discharge step, transfers additional heat to the work fluid before its expansion, operated in the turbine 4. In addition, unlike the embodiment of FIG. 8, the heat exchangers 12 interposed between two successive turbocompressors 5 are coupled to a system 18 for removing the heat which is different from the first thermal store 9.

In a non-illustrated variant, one of the heat exchangers 12 interposed between two successive turbocompressors 5 is operatively coupled to the first thermal store 9 and the other heat exchanger 12 is operatively coupled to the system 18 for removing the heat. The system 18 for removing heat, in such case, can serve for removing the residual heat stored in the first thermal store 9, so as to ensure a constant temperature at the inlet to the compressor placed more downstream.

Figure 11:
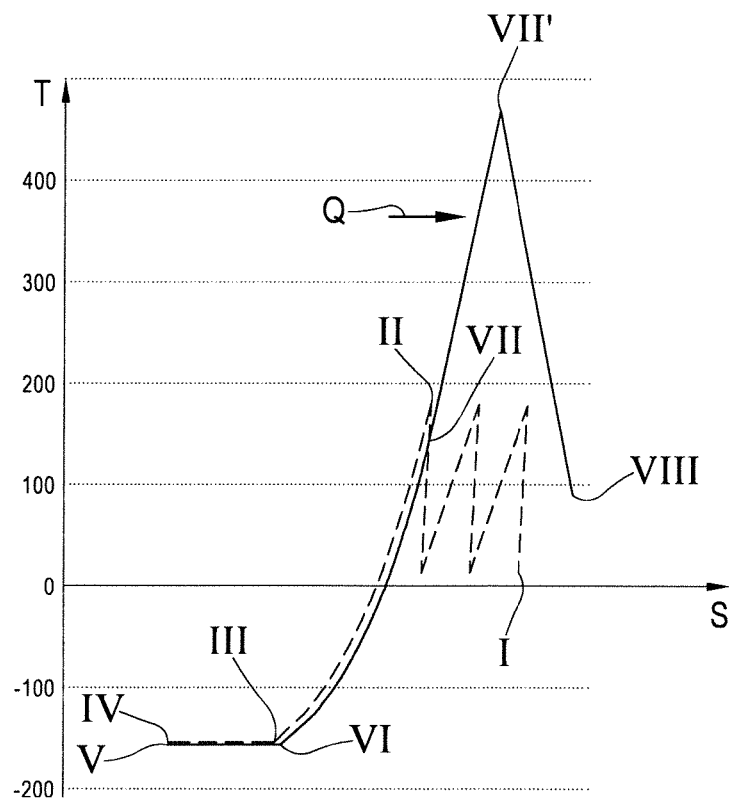

FIG. 11 illustrates the transformation of the plant of FIG. 10 in a T-S diagram, which shows the introduction of the additional heat Q from outside (from point VII to point VII').

Figure 12:
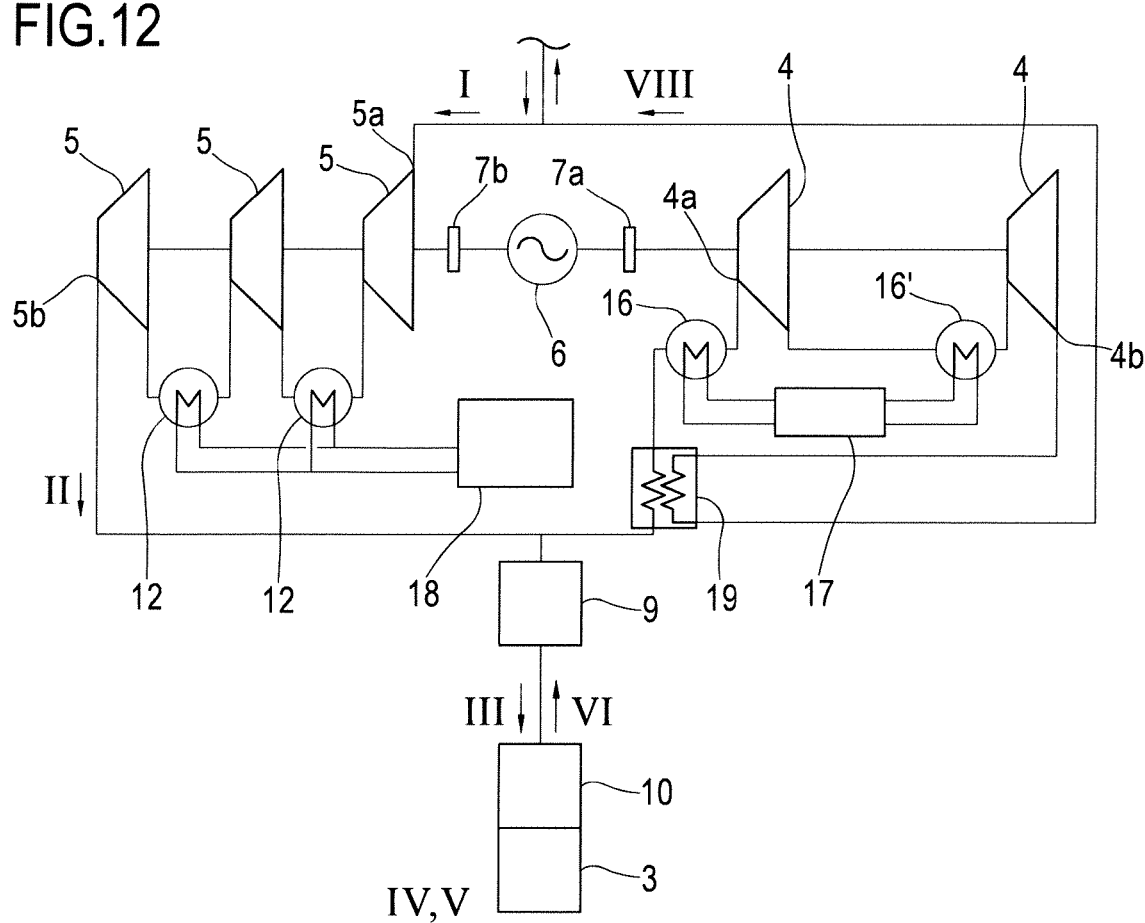

The embodiment of the plant 1 of FIG. 12 differs from that of FIG. 10 since it comprises a further additional heat exchanger 16' operatively interposed between two successive turbines 4 (interheated in discharge step) and the source of external heat 17 is operatively coupled also to said further additional heat exchanger 16'. In addition, a recuperator 19 is present which operatively couples a first portion of the discharge path placed between the first thermal store 9 and a first turbine 4 with a second portion of the discharge path placed between a second turbine 4 and the basin 2, not illustrated in FIG. 12, in order to pre-heat the work fluid before the expansion.

Figure 13:
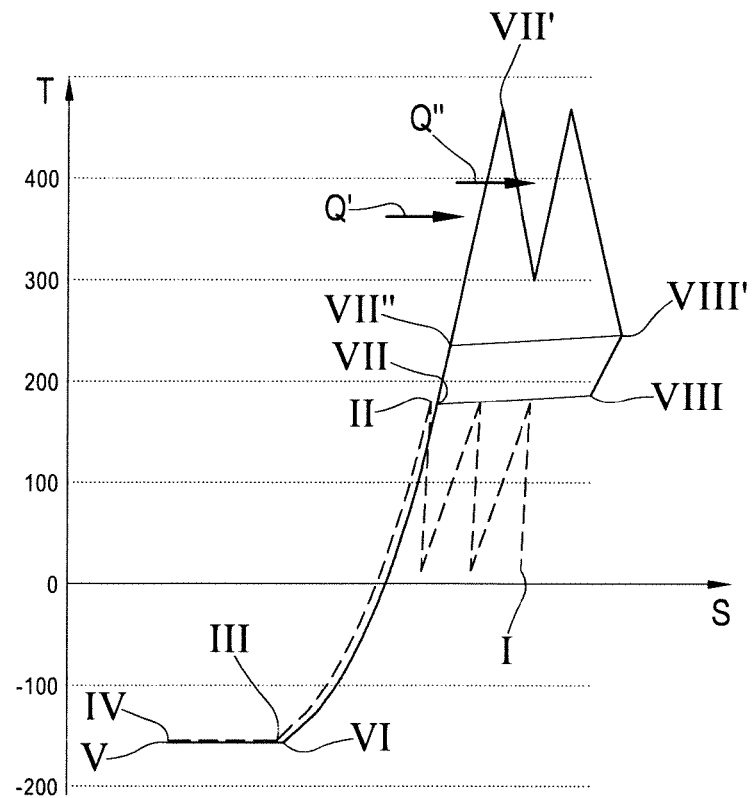

FIG. 13 illustrates the transformation of the plant of FIG. 12 in T-S diagram, in which the recovery of heat (VII-VII" and VIII'-VIII) is observed along with the double introduction of the additional heat Q', Q" from outside (from point VII" to point VII' and from point VII''' to point VII" ").

Figure 14:
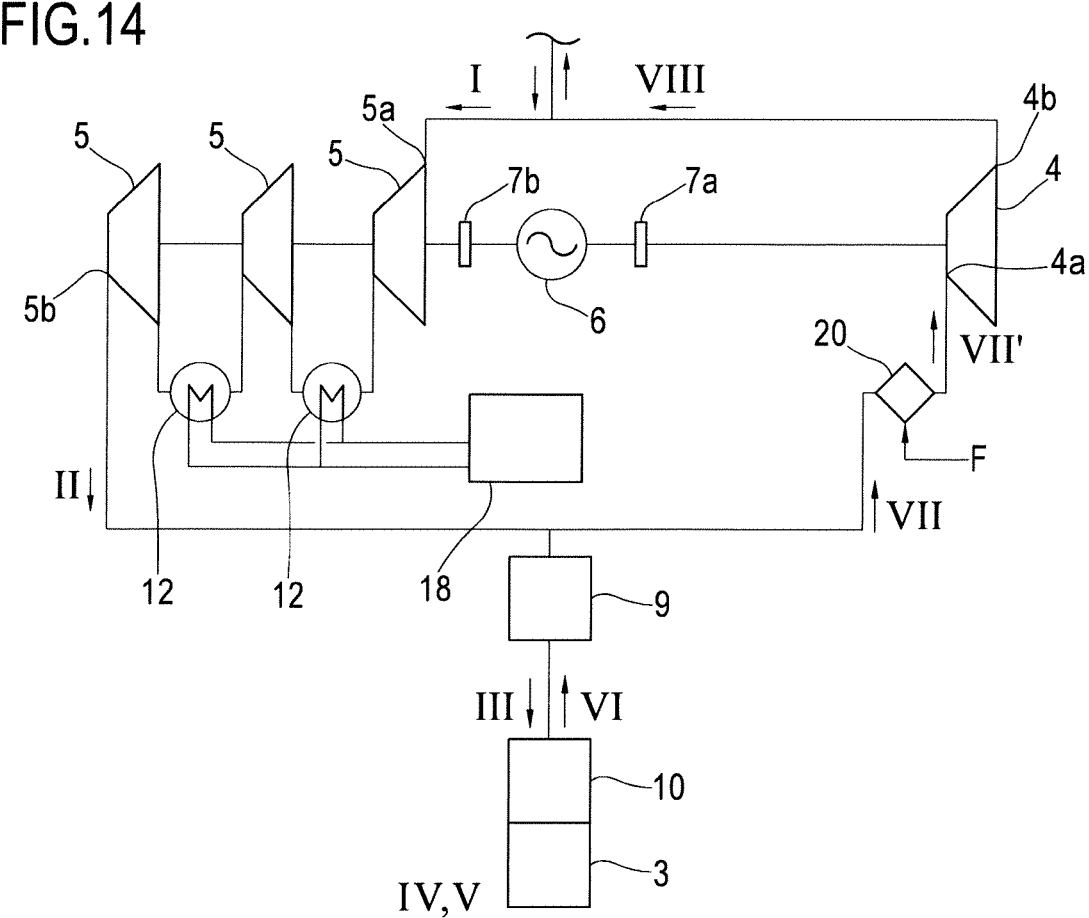

The embodiment of the plant 1 of FIG. 14 differs from that of FIG. 8 since, in place of the additional heat exchanger 16 and of the source of external heat 17, a combustion chamber 20 is present, i.e. a source of internal heat. The combustion chamber 20 is operatively placed on the discharge path and is placed between the first thermal store 9 and the turbine 4. Fuel F is introduced into the combustion chamber in order to generate a combustion with a comburent present in the work fluid (e.g. the oxygen of the air) and produce heat. The work fluid flows through the combustion chamber 20 and receives heat from the combustion generated in the combustion chamber 20 itself.

Figure 15:
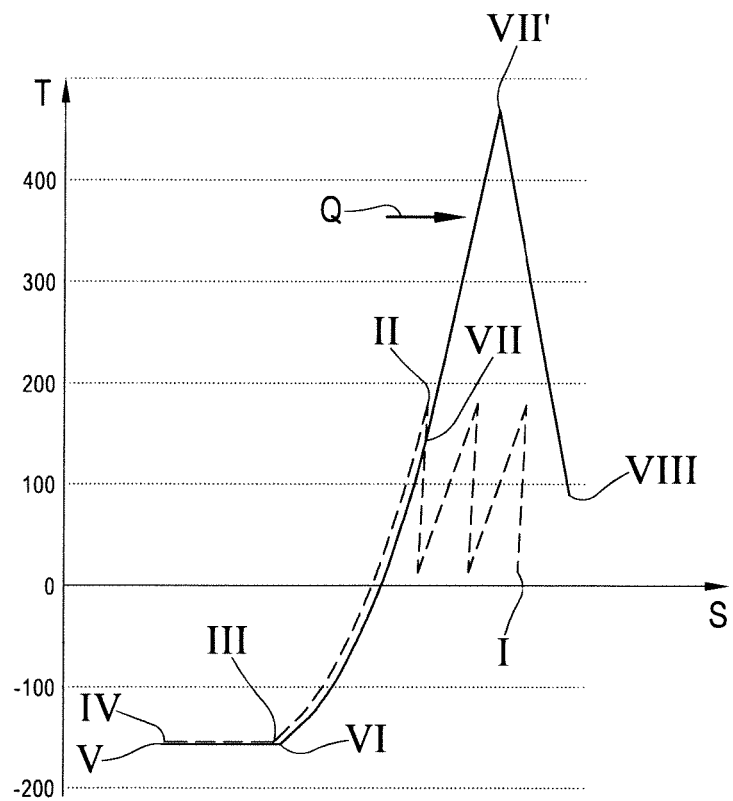

FIG. 15 illustrates the transformation of the plant of FIG. 14 in a T-S diagram, in which the introduction of the additional heat Q by the combustion (from point VII to point VII') is observed.

Figure 16:
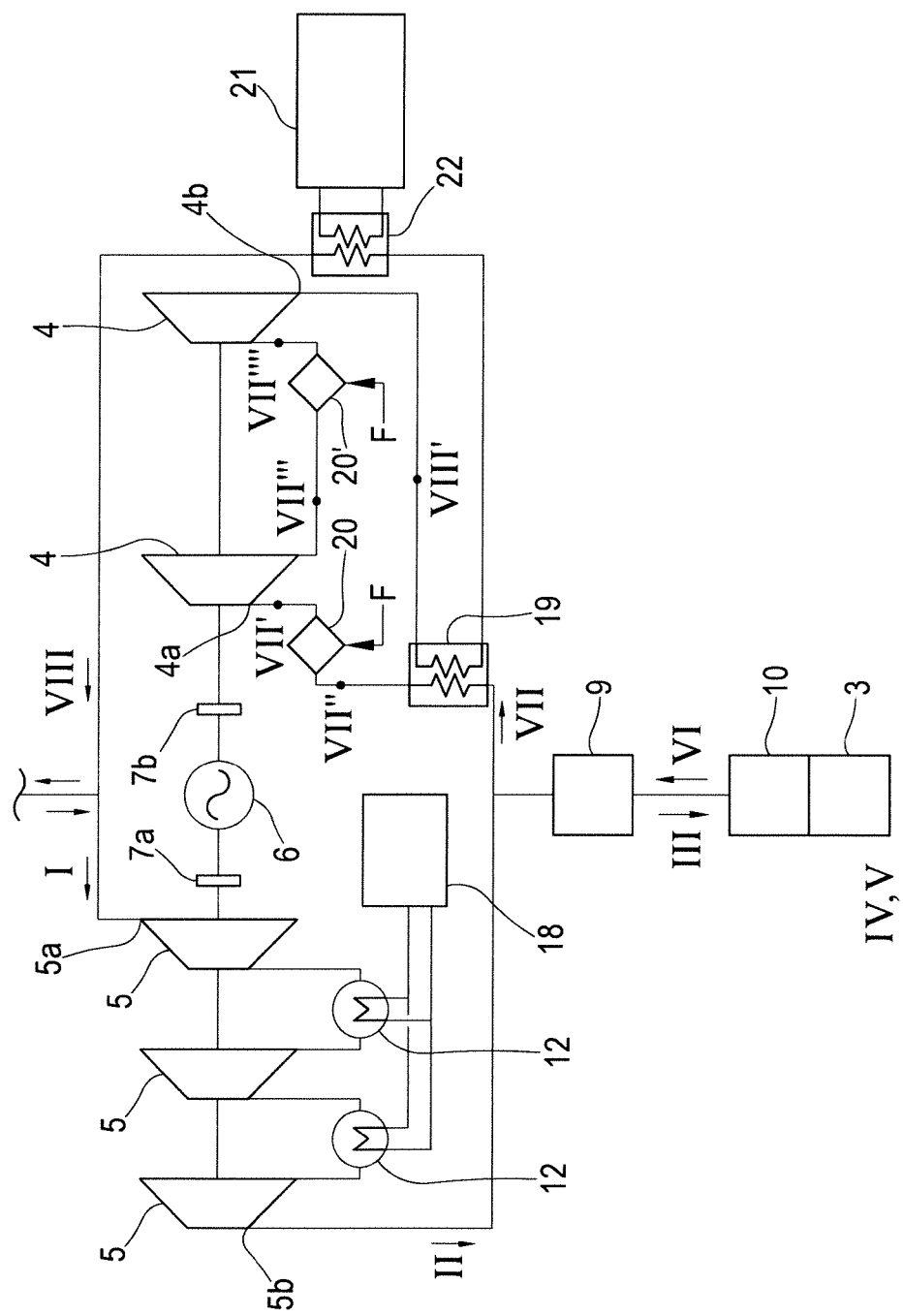

The embodiment of the plant 1 of FIG. 16 differs from that of FIG. 12 since, in place of the additional heat exchangers 16, 16', it has a combustion chamber 20 and an additional combustion chamber 20'. In addition, a "bottoming" cycle or system 21 is present. The "bottoming" system 21 is operatively coupled to the plant 1 by means of an exchanger 22 placed on the discharge path and between the second turbine 4 and the basin 2, not illustrated in FIG. 16, in order to recover residual heat from the outlet/discharge 4b of the second turbine 4. For example, the "bottoming" system 21 can produce extra power or be a source for a heat user (for example: district heating, urban teleheating, industrial processes).

Figure 17:
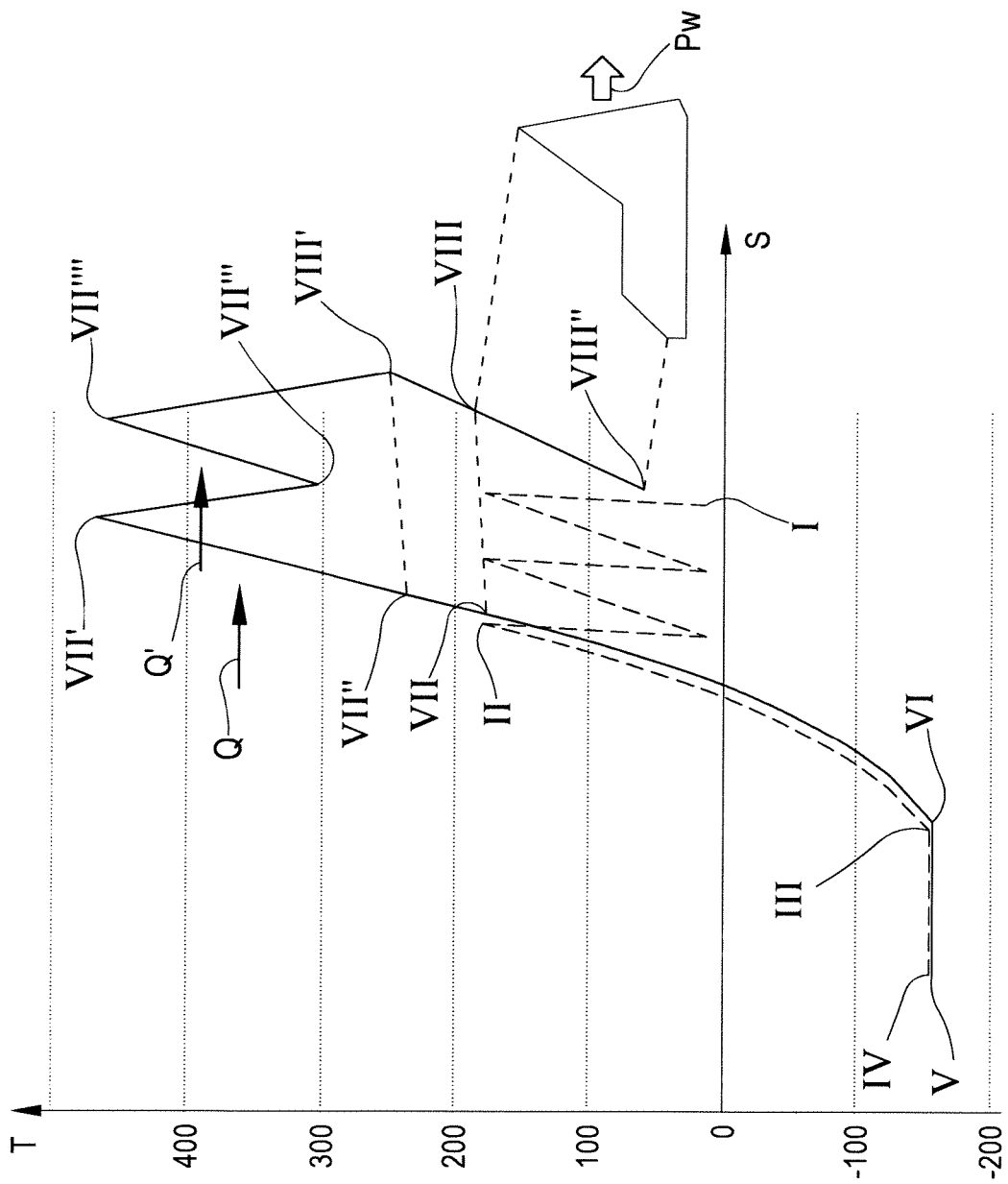

FIG. 17 illustrates the transformation of the plant of FIG. 16 in a T-S diagram which is analogous to that of FIG. 13 and additionally illustrates the "bottoming" cycle with generation of extra power Pw.

Figure 18:
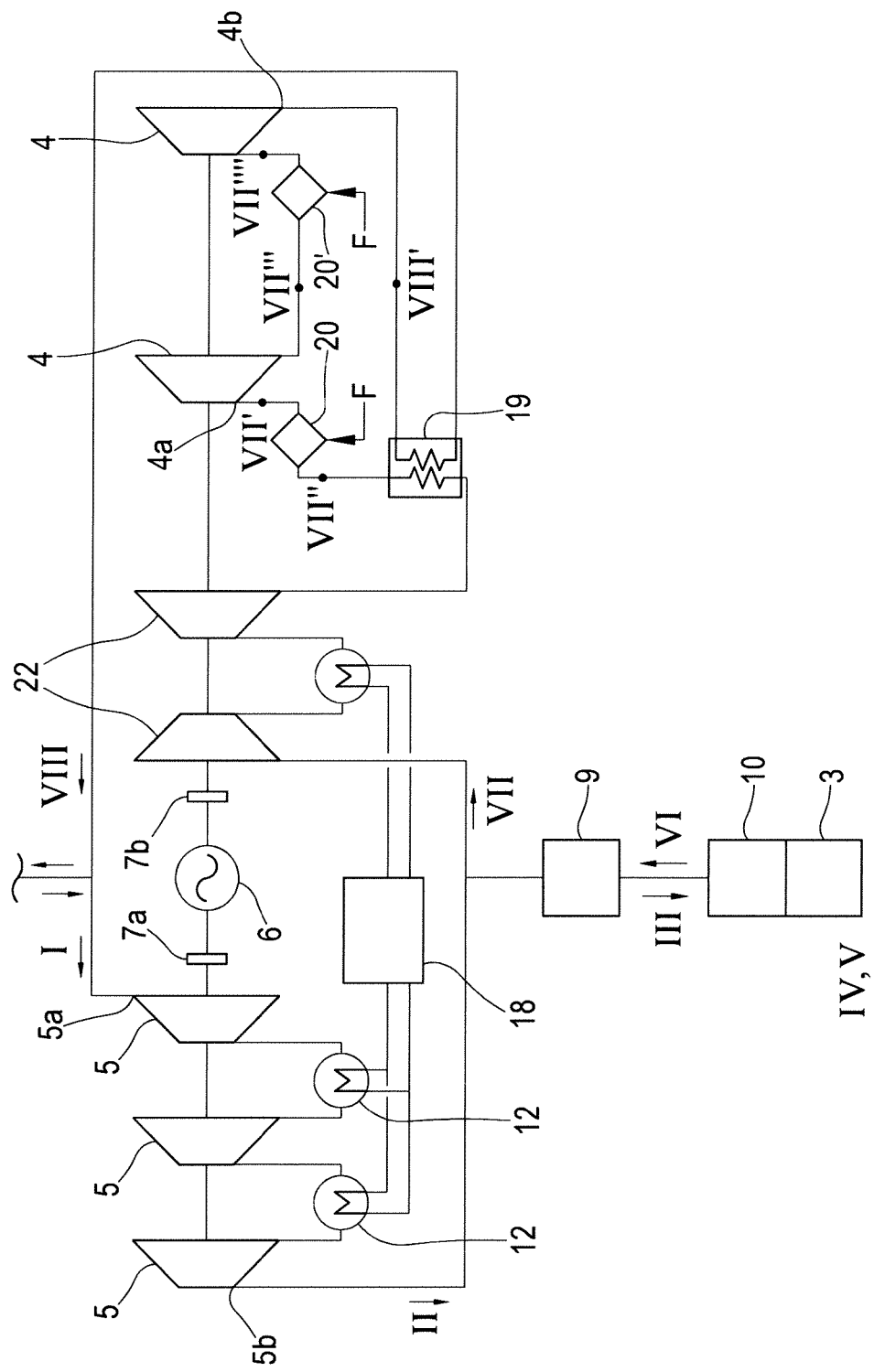

The embodiment of the plant 1 of FIG. 18 differs from that of FIG. 16 since there is no "bottoming" system 21 but it also comprises a pair of additional intercooled compressors 22 arranged on the discharge path, between the first thermal store 9 and the turbines 4, in particular between the first thermal store 9 and the recuperator 19. The intercooling is operated by an exchanger 23 placed between the two additional compressors 22 and operatively connected to the heat removal system 18.

Figure 19:
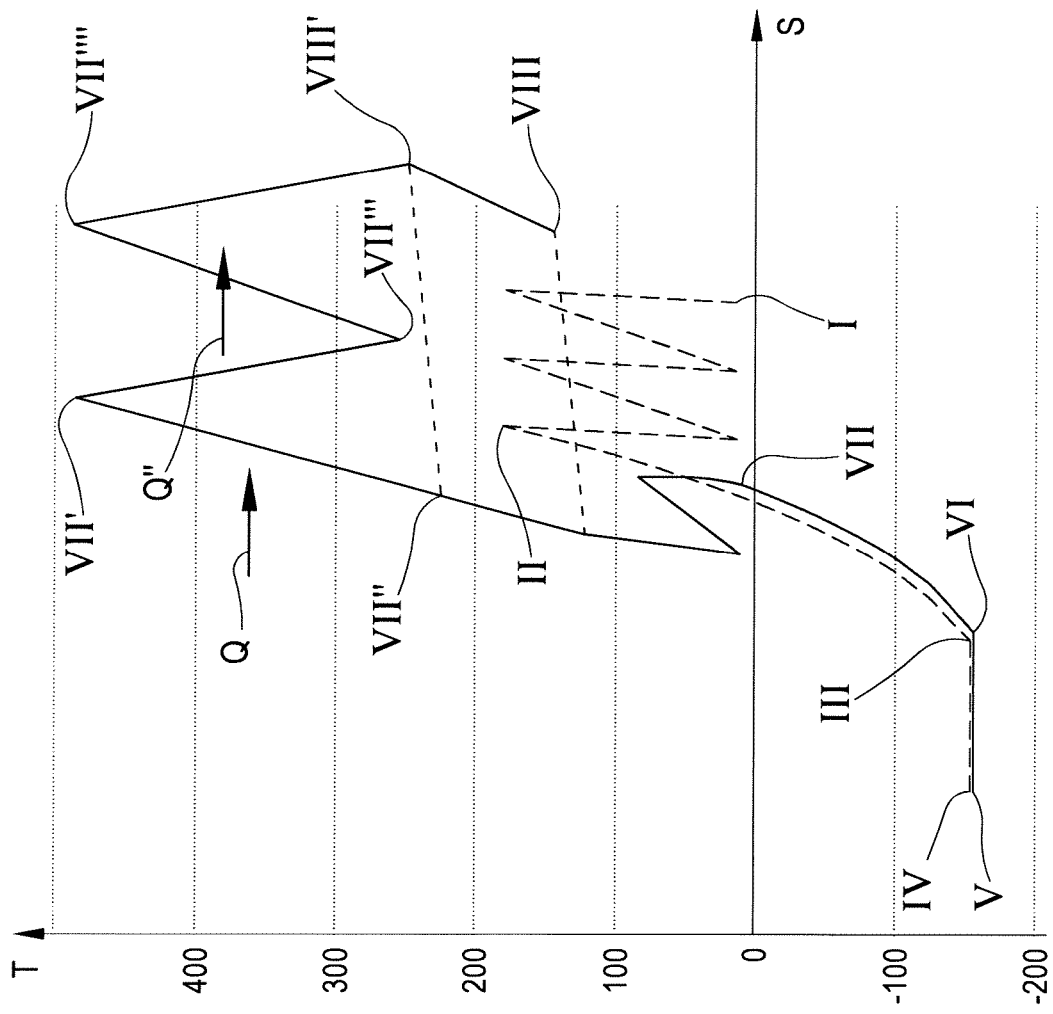

FIG. 19 illustrates the transformation of the plant of FIG. 18 in a T-S diagram which is analogous to that of FIG. 17 and additionally illustrates the double compression intercooled in the discharge step (between VII and VII").

Figure 20:
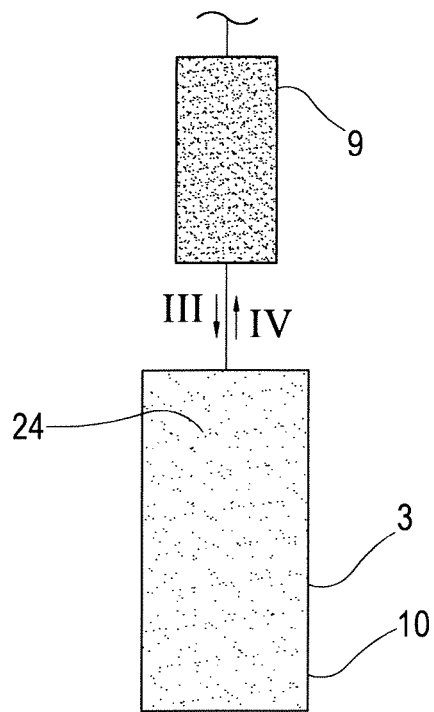
FIGS. 20 and 21 illustrate examples of a portion of the plant according to the invention.

FIG. 20 illustrates an embodiment of a thermal store 8 comprising the first 9 and the second 10 thermal store, in which the second thermal store 10 is integrated in the tank 3.

The first thermal store 9 is of "packed bed" type and comprises a cistern, for example made of stainless steel, which contains a thermal mass 24 defined, for example, by inert material such as gravel or metal spheres or ceramic spheres.

The thermal mass 24 defines the first heat carrier. The work fluid which flows through the first thermal store 9 fills the interstices delimited in the thermal mass and hits the loose material, exchanging the sensible heat therewith.

Also the second thermal store 10 is of "packed bed" type and comprises a cistern, for example made of stainless steel, which contains a thermal mass defined, for example, by inert material such as gravel or metal spheres or ceramic spheres. The thermal mass defines the second heat carrier. The work fluid that comes into contact with the thermal mass condenses and is stored in the cistern that therefore also defines the tank 3.

Figure 21:
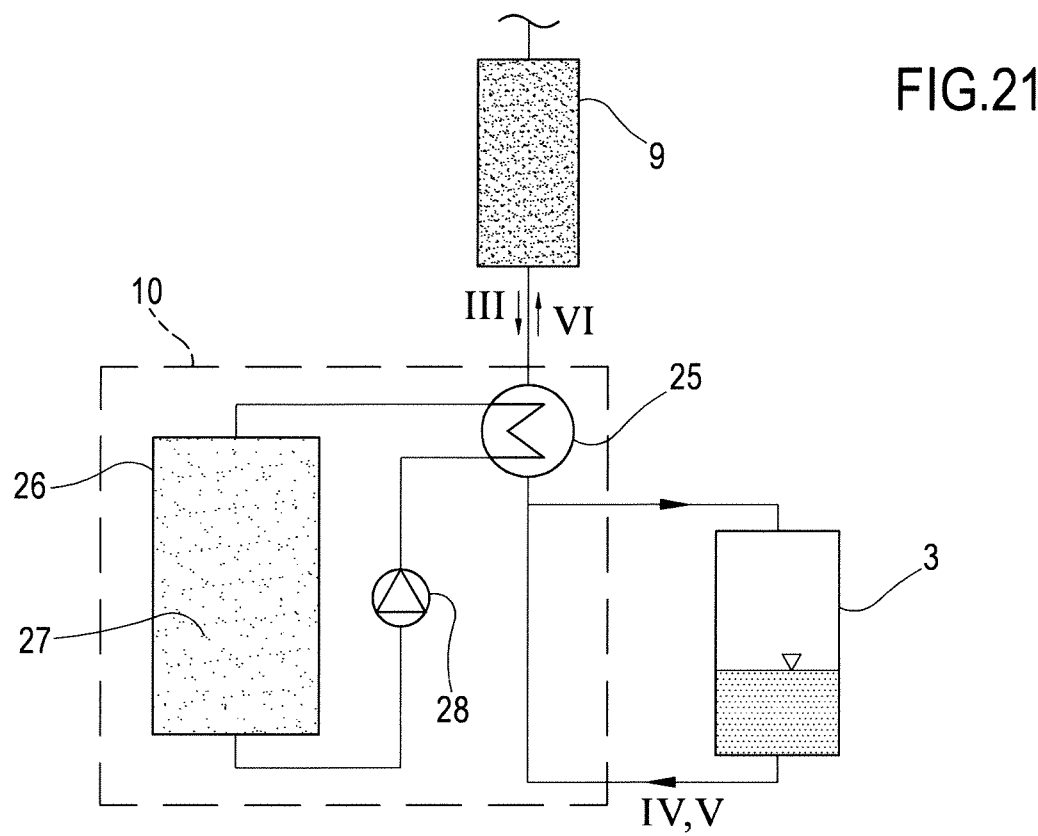

FIG. 21 illustrates a different thermal store 8 embodiment, in which the first thermal store 9 is identical to that of the preceding FIG. 20 while the second thermal store 10 is separate from the tank 3. The second thermal store 10 comprises a heat exchanger 25 placed between the first thermal store 9 and the tank 3 and a cistern 26 containing a respective thermal mass 27 defined by inert material. A circuit provided with a pump 28 connects the cistern 26 with the exchanger 25 and contains a carrier fluid. The carrier fluid and the thermal mass 27 define the second heat carrier. The work fluid exchanges the latent heat with the carrier fluid in the exchanger 25 and the carrier fluid, together with the thermal mass with which it comes into contact, stores such heat. In the exchanger 25, the work fluid condenses and thus flows in the tank 3, where it is stored up to the next discharge step.

Figure 22:
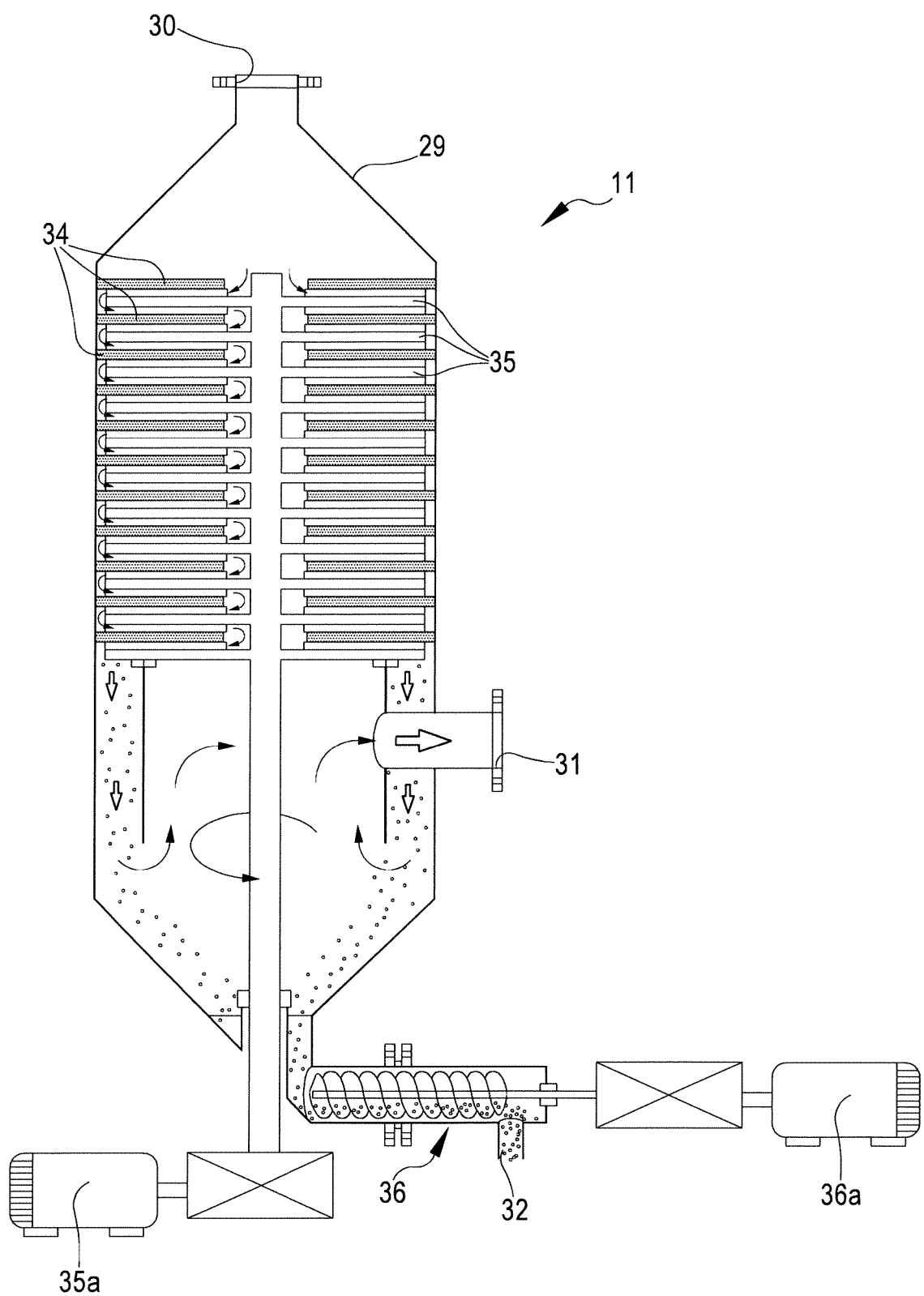
FIGS. 22, 23 and 24 illustrate respective embodiments of a device of the plant according to the invention.

One example of the device 11 for the carbon dioxide capture $CO_2$ is illustrated in FIG. 22. The device 11 comprises a tank 29 for containing pressurized air. The tank 29 has an inlet 30 for the air, an outlet 31 for the mixture of air with carbon dioxide removed therefrom and an outlet 32 for the carbon dioxide that is separate from the air. The first store 9 comprises elements 33 configured for cooling the mixture and solidifying the carbon dioxide and a system for extracting the solidified carbon dioxide from the tank 29. In the illustrated embodiment, the elements 33 for cooling the mixture and solidifying the $CO_2$ comprise a plurality of fixed 34 and/or moving plates that were previously cooled (in the discharge step of the TTC cycle) to a temperature lower than the temperature necessary for the solidification of the $CO_2$ itself. In order to separate the solidified $CO_2$, it is first provided to remove from the plates 34 the $CO_2$ that is solidified on the walls of the plates 34 themselves and then to separate from the mixture the solid $CO_2$ already removed from the plates 34. For such purpose, a mechanical system is used which works via rubbing. In the illustrated embodiment, the rubbing system comprises rotary blades 35, moved by a respective motor 35a, which have a double function: the first, to separate the dry $CO_2$ from the plates; the second, to move solid particles of $CO_2$ towards the system for separating the $CO_2$ from the mixture via gravity, so that the $CO_2$ particles with greater density fall downward. The blades 35 can have a shape such to generate a movement of the solid particles that is centrifugal radial or centripetal radial, so as to transport said solid particles into the zone of separation via gravity. A system of mechanical extraction 36, e.g. a screw moved by a respective motor 36a, allows the extraction of the solid particles of $CO_2$ through the outlet 32.

Figure 23:
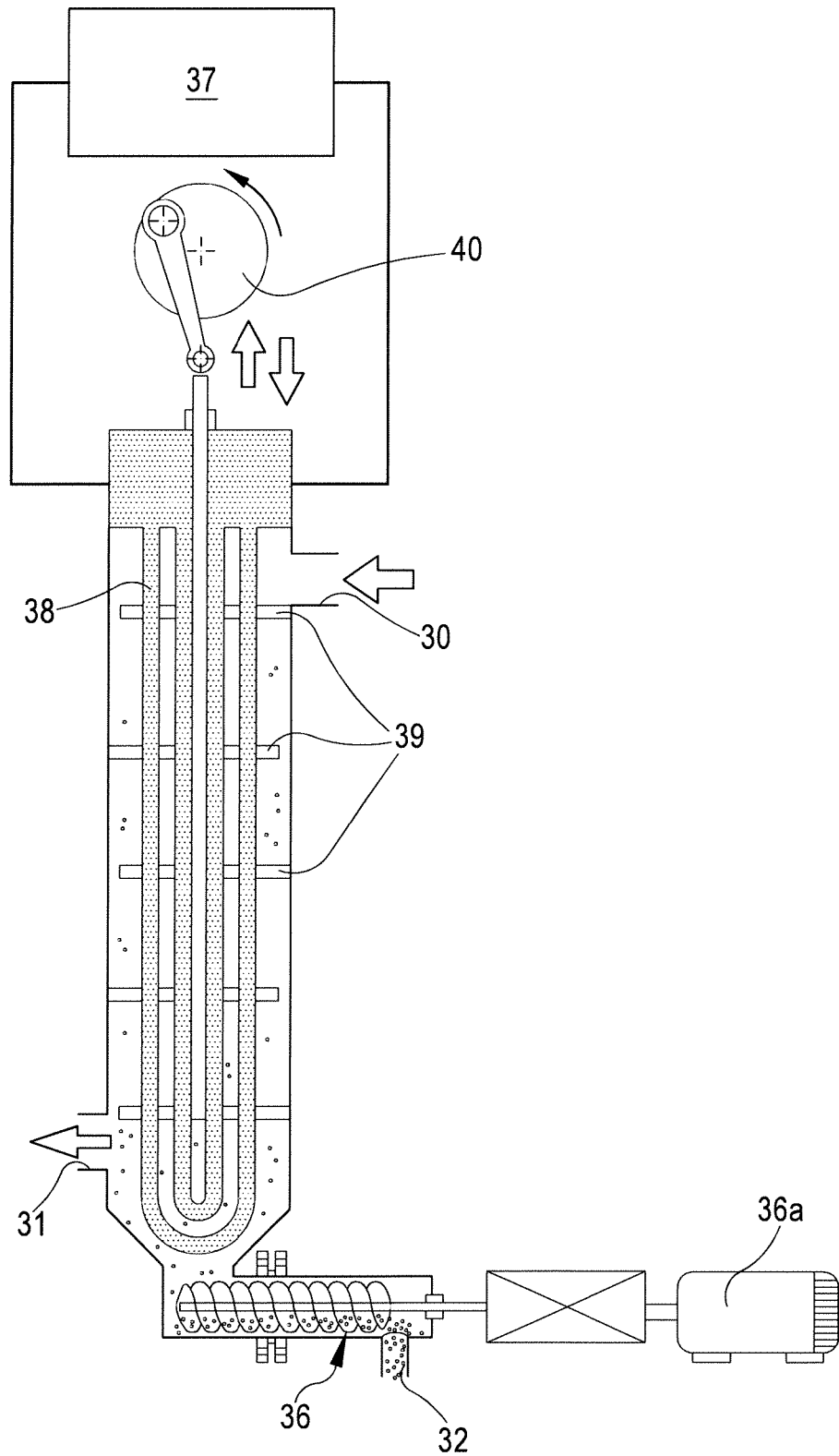

A different embodiment of the device 11 for the carbon dioxide $CO_2$ capture is illustrated in FIG. 23. The elements in common with the device 11 of FIG. 22 have the same reference numbers. The device 11 of FIG. 23 comprises an external unit 37 for extracting heat from the mixture, such as a "chiller", connected to a heat exchanger 38, for example, to a tubular exchanger, in which the carrier fluid of the "chiller" passes in the tubes. Outside the tubes, the $CO_2$ will solidify. In a subsequent step, the $CO_2$ can be mechanically removed and recovered, for example with a hammering of the tubes or by means of a reciprocating movement of the plates 39 which are moved parallel to the tubes and slide along the same by means of a respective motor 40. Such plates 39 have holes for the passage of the tubes and can also have the function of "baffle" of the heat exchanger 38. The separated $CO_2$ particles are transported towards the separation and collection zone via gravity and by exploiting the flow of the mixture in the passage through the tank 29.

Figure 24:
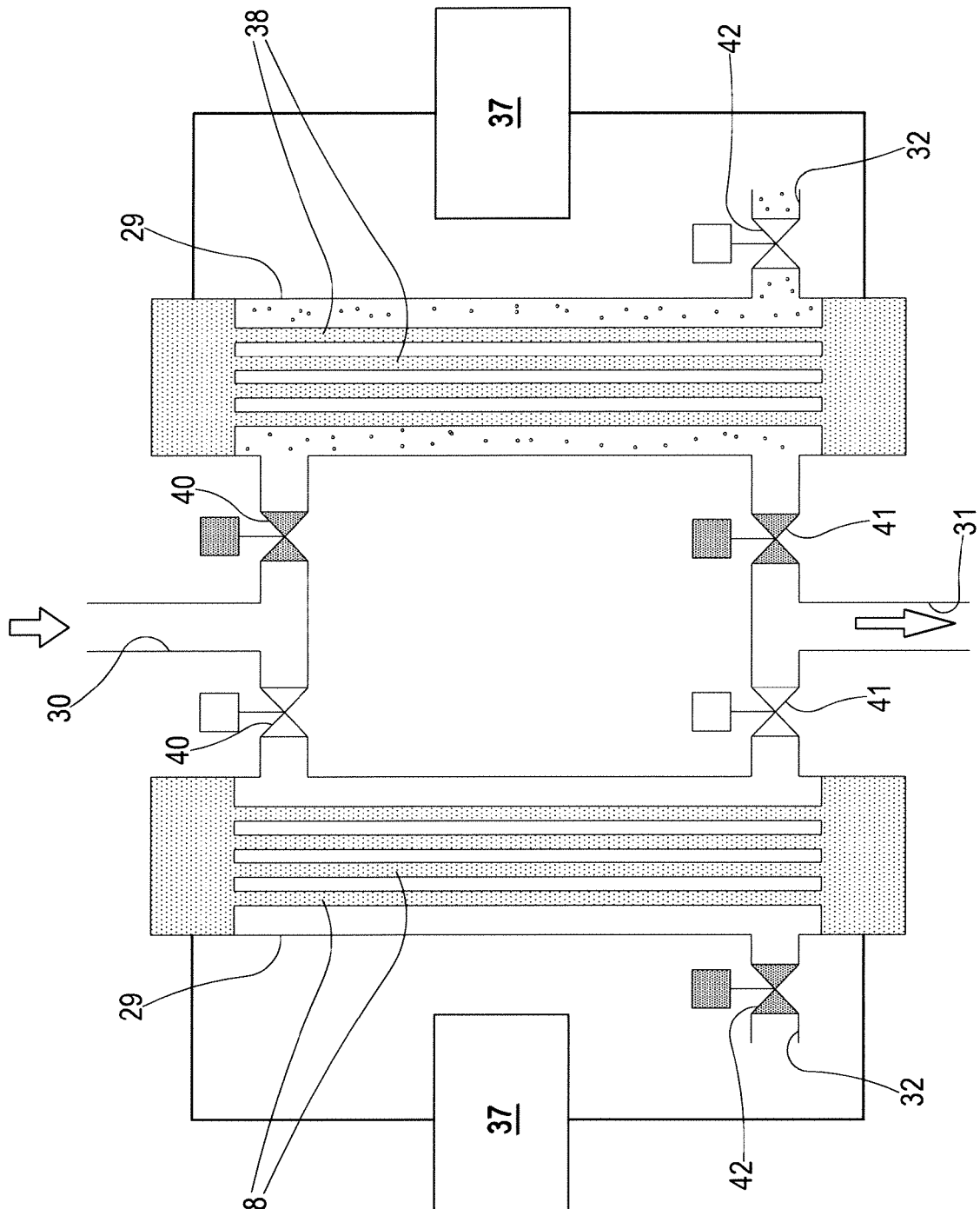

A further embodiment of the device 11 for the carbon dioxide $CO_2$ capture is illustrated in FIG. 24. The elements in common with the devices 11 of FIGS. 22 and 23 have the same reference numbers. Such device 11 comprises two tanks 29, each provided with a respective "chiller" 37 and with a tubular heat exchanger 38. The two tanks 29 are connected in parallel with the inlet 30 and the outlet 32 for the mixture and each has a respective outlet for the $CO_2$. First valves 40 on the inlet 30, second valves 41 on the outlet 31 and throttle valves 42 on the outlets 32 for the $CO_2$ allow working—in an alternating manner—the two tanks 29 and the two "chillers" 37 and heat exchangers 38. While the mixture flows through one of the two tanks 29, exiting from the respective outlet 31 (first and second valves 40, 41 open and throttle valve 42 closed) and the solid $CO_2$ is formed on the tubes of the respective heat exchanger 38, from the other tank 29 (first and second valves 40, 41 closed and throttle valve 42 open) the $CO_2$—previously formed on the tubes—newly passes into the gaseous phase and exits from the tank 29 by means of the depressurization of the tank 29 in stand-by condition.

NUMERICAL EXAMPLE

In an embodiment example, the plant 1 can be schematized like that of FIG. 2. The work fluid is atmospheric air and the basin at nearly constant pressure is the environment.

The plant 1 comprises only one axial compressor 5 of turbogas type which works at nearly constant delivery pressure (with fixed revolutions), with compression ratio comprised between 12 and 24, connected to an electric motor for absorbing the electrical energy and converting it into thermal and potential energy (from point I to point II in FIG. 3). A single axial turbine 4 is connected to an electric generator in order to convert the potential and thermal energy into electrical energy, by exploiting the jump from point VII to point VIII in FIG. 3.

The plant 1 comprises a first thermal store 9 (TES) of "packed bed" type which absorbs sensible heat from the air, between the maximum delivery temperature of the compressor 5 (point II) and the proximal condensation temperature of the air at pressure equal to the delivery of the compressor 5, except for the load losses (point III) during the storage step, while during the discharge step, it transfers heat, heating the air from a temperature close to evaporation of the air from point VI to point VII.

The plant 1 comprises a second thermal store 10 (TES) for the latent heat of "packed bed" type which absorbs the latent heat between the maximum and the minimum temperature of condensation of the air at a pressure equal to the delivery of the compressor 5 except for the load losses, i.e. from point III to point IV during the storage step, in order to condense the air. During the discharge step, the second thermal store 10 operate at a pressure lower than the condensation pressure and evaporates the air by transferring latent heat, i.e. it works between the point V and the point VI. The second thermal store 10 integrates the tank 3, i.e. it is constituted by a single tank made of stainless steel, or by a battery of identical tanks, which have the object both of containing the inert material that defines the second heat carrier (useful for the purpose of the heat storage) and of containing the liquefied air.

Characteristic values of the abovementioned work points (from I to VIII) are summarized in the following Table.

TABLE

| Point | | I | II | III | IV | V | VI | VII | VIII |
|---|---|---|---|---|---|---|---|---|---|
| Pressure [bar] | Nominal | 1.01 | 18 | 17 | 17 | 15 | 15 | 14.5 | 1.01 |
| | Min | Patm* | 12 | 11.3 | 11.3 | 9 | 9 | 8.7 | Patm* |
| | Max | | 24 | 22.7 | 22.7 | 20.8 | 20.8 | 19.7 | |
| Temperature [° C.] | Nominal | 15 | 415 | −155 | −158 | −160 | −158.5 | 400 | 75 |
| | Min | Tamb* | 340 | −162.5 | −165 | −168 | −166 | 330 | 70 |
| | Max | | 470 | −150 | −152 | −154 | −152 | 460 | 80 |

N.B. AI point I, Patm and Tamb are parameters that depend on the place of installation. Pressures and temperatures in the subsequent points are calculated starting from the nominal values of point I.

The invention claimed is:

1. A process for energy storage comprising:
   actuating a Cyclic Thermodynamic Transformation, first in a storage configuration/step and then in a discharge configuration/step, between a basin for storing a work fluid having a critical temperature lower than 0° C. and a tank for storing said work fluid in an at least partly liquid or super-critical phase with a storage temperature close to the critical temperature, wherein
   in the storage step the process stores heat and potential energy in a form of pressure and generates energy in the discharge step;
   in the storage step, first a sensible heat and subsequently a latent heat are removed from the work fluid by means of at least one heat carrier, in order to store—in the tank—said work fluid in the at least partly liquid or super-critical phase and with said storage temperature;
   in the discharge step, first the latent heat and subsequently the sensible heat are transferred to the work fluid by means of said at least one heat carrier;
   in the storage step, a condensation of the work fluid occurs at variable pressure; and in the discharge step, an evaporation of the work fluid occurs at variable pressure.

2. The process according to claim 1, wherein the storage step comprises compressing the work fluid before removing the sensible heat and the latent heat from said work fluid and subsequently storing the work fluid in the tank at a storage pressure substantially equal to or close to an end compression pressure.

3. The process according to claim 1, wherein the discharge step comprises: expanding the work fluid after having transferred the latent heat and the sensible heat to said work fluid and without any increase of pressure before the expansion.

4. The process according to claim 1, wherein
in the storage step, the sensible heat is removed by means of a first heat carrier and the latent heat is removed by means of a second heat carrier, and
in the discharge step, the latent heat is transferred by means of the second heat carrier and the sensible heat is transferred by means of the first heat carrier.

5. The process according to claim 1, wherein the work fluid is a single-component or a mixture.

6. The process according to claim 1, wherein the basin is at a substantially constant pressure.

7. The process according to claim 1, wherein the critical temperature of the work fluid is lower than −70° C.

8. A process for energy storage comprising:
actuating a Cyclic Thermodynamic Transformation, first in a storage configuration/step and then in a discharge configuration/step, between a basin for storing a work fluid having a critical temperature lower than 0° C. and a tank for storing said work fluid in an at least partly liquid or super-critical phase with a storage temperature close to the critical temperature, wherein
in the storage step the process stores heat and potential energy in a form of pressure and generates energy in the discharge step;
in the storage step, first a sensible heat and subsequently a latent heat are removed from the work fluid by means of at least one heat carrier, in order to store—in the tank—said work fluid in the at least partly liquid or super-critical phase and with said storage temperature;
in the discharge step, first the latent heat and subsequently the sensible heat are transferred to the work fluid by means of said at least one heat carrier;
in the storage step, the sensible heat is removed by means of a first heat carrier and the latent heat is removed by means of a second heat carrier; and
in the discharge step, the latent heat is transferred by means of the second heat carrier and the sensible heat is transferred by means of the first heat carrier.

9. The process according to claim 8, wherein the storage step comprises compressing the work fluid before removing the sensible heat and the latent heat from said work fluid and subsequently storing the work fluid in the tank at a storage pressure substantially equal to or close to an end compression pressure.

10. The process according to claim 8, wherein the discharge step comprises: expanding the work fluid after having transferred the latent heat and the sensible heat to said work fluid and without any increase of pressure before the expansion.

11. The process according to claim 8, wherein
in the storage step, a condensation of the work fluid occurs at variable pressure, and
in the discharge step, an evaporation of the work fluid occurs at variable pressure.

12. The process according to claim 8, wherein the work fluid is a single-component or a mixture.

13. The process according to claim 8, wherein the basin is at a substantially constant pressure.

14. The process according to claim 8, wherein the critical temperature of the work fluid is lower than −70° C.

* * * * *